United States Patent
Okamoto et al.

(10) Patent No.: US 7,073,025 B2
(45) Date of Patent: Jul. 4, 2006

(54) DISK ARRAY APPARATUS AND CONTROL METHOD FOR THE SAME

(75) Inventors: Takeki Okamoto, Odawara (JP); Mikio Fukuoka, Odawara (JP)

(73) Assignee: Hitachi, Ltd., Tokyo (JP)

( * ) Notice: Subject to any disclaimer, the term of this patent is extended or adjusted under 35 U.S.C. 154(b) by 149 days.

(21) Appl. No.: 10/849,038

(22) Filed: May 20, 2004

(65) Prior Publication Data
US 2005/0198553 A1  Sep. 8, 2005

(30) Foreign Application Priority Data
Mar. 8, 2004  (JP) ............................. 2004-063313

(51) Int. Cl.
*G06F 12/14* (2006.01)

(52) U.S. Cl. ............................. 711/114; 711/113; 714/5

(58) Field of Classification Search .................... None
See application file for complete search history.

(56) References Cited

U.S. PATENT DOCUMENTS

| | | | |
|---|---|---|---|
| 5,761,411 A | 6/1998 | Teague et al. | |
| 6,061,761 A | 5/2000 | Bachmat | |
| 6,366,981 B1 | 4/2002 | Koike | |
| 6,611,896 B1 | 8/2003 | Mason, Jr. et al. | |
| 6,715,054 B1 | 3/2004 | Yamamoto | |
| 2001/0054133 A1 | 12/2001 | Murotani et al. | |
| 2004/0250021 A1* | 12/2004 | Honda et al. | 711/114 |

FOREIGN PATENT DOCUMENTS

JP     2003-141824     5/2003

* cited by examiner

*Primary Examiner*—Pierre M. Vital
(74) *Attorney, Agent, or Firm*—Mattingly, Stanger, Malur & Brundidge, P.C.

(57) ABSTRACT

The present invention relates to provide a technology which can detect a disk drive with degradation in the performance even if the disk drive itself does not comprise a function to detect degradation in the performance and which can realize a disk array apparatus which meets a request of a customer by changing a detection level of the degradation in the performance. In the apparatus, a disk controller: generates logical storage areas used for writing or reading data and having redundancy to store data, using the storage areas in the plurality of disk drive; monitors the storing areas in which a request for writing/reading data into/from the plurality of disk drives forming the logical storage areas is stored; and specifies, among the plurality of disk drives forming the logical storage areas, a disk drive having a large number of repeated times and block the specified disk drive.

10 Claims, 22 Drawing Sheets

210,220,230,240,260

Write pending data

Write pending data size    DD01+DD02

Write pending data

Write pending data size    DD01+DD02+DD03

Write pending data

Write pending data size    DD01+DD03

FIG. 22

```
          Performance delay detection level

○ A : Easy
          ● B : Normal
          ○ C : Hard
          ○ Custom
       Write pending data coefficient    ┌──┐
                           (1.0~4.0)     └──┘
       Queue-comparison coefficient      ┌──┐
                           (1.0~4.0)     └──┘
       Average response-time             ┌──┐
                 coefficient (1.0~4.0)   └──┘
```

FIG. 23

| Level | n1 | n2 | n3 |
|---|---|---|---|
| A | 1.2 | 1.2 | 1.2 |
| B | 1.5 | 1.5 | 1.5 |
| C | 2.0 | 2.0 | 2.0 |
| Custom | Desired value | Desired value | Desired value |

| Level | M1 | Retrying times |
|---|---|---|
| A | 1 | 5 |
| B | 4 | 10 |
| C | 8 | 20 |
| Custom | Desired value | Desired value |

DISK ARRAY APPARATUS AND CONTROL METHOD FOR THE SAME

CROSS-REFERENCE TO RELATED APPLICATION

The present application claims priority from Japanese Paten Application No. JP2004-63313 filed on Mar. 8, 2004, the content of which is hereby incorporated by reference into this application.

TECHNICAL FIELD OF THE INVENTION

The present invention relates to a disk array apparatus and a control technology for the same, and, more particularly, to an effective technology applied for detection of a disk drive with degradation in the performance.

BACKGROUND OF THE INVENTION

According to the study of the inventors, the following technologies have been considered to contribute to previous disk array apparatuses and the control technology for the apparatuses.

For example, when an error is caused in operation of writing or reading data into or from a disk drive in the previous disk array apparatuses and the control technology for the apparatuses, repeating operation of write or read for data, so-called retry operation is executed. In the retry operation, a reason for the caused error is cleared, the number of the retry operations corresponding to the cleared reason is set, and, when there is success in recovery from the error within the set retrying times, the success is reported as "recovered" to a host system (Refer to Japanese Patent Application Laid-open No. 2003-141824).

Recently, a larger space of a hard drive in a disk array apparatus has caused the higher density in the recording density. Thereby, even if the error rate per recording density is similar to that of the previous disk drive, the number of errors per disk drive is proportional to the recording density. Accordingly, when all recoveries by the retry operations are reported to a host system in a similar manner to that of the previous cases, the number of error reports becomes too much and there is a possibility that a related disk drive is likely to be judged as a defective one.

As one example of solutions for the possibility, when the retry operations are executed several times, not a method in which "recovered" (success in the recovery) is reported to a host system, but a method in which normal termination is reported to the host system, that is, a so-called un-reported retry is adopted in some cases. In the un-reported retry, the host system using the disk drive usually monitors the response time of the disk drive, but, considering sudden temporary failures, it is a common practice to set a monitoring period as 10 through 100 times normal response time. Therefore, a disk drive, in which the recovery operation is continuously executed to cause the response time which is 1.5 times through 2.0 times the normal value at all times, is not judged at detection to be a delayed drive.

SUMMARY OF THE INVENTION

Incidentally, according to the above-described study of the previous disk array apparatus and the control technology for the same, which has been conducted by the inventors, the following results are obtained.

For example, in the previous disk array apparatus and the control technology for the same, a reporting period in the disk drive has become several times of reporting time in a normal case by the un-reported retry which the host system can not recognize or, by very small failures in head control sequences μ which have become more complex, even if a notification that operations have normally completed has been reported to the host system as described above. When the above-described circumstances are generated at all times, the disk drive is judged at all times to be a drive with degradation in the performance. In this connection, sudden temporary failures are also detected when the monitoring period is simply set in the host system as about several times of reporting time in normal cases, statistical judgment is required for separation from the failures.

Then, an object of the present invention is to provide a technology which can detect a disk drive with degradation in the performance even if the disk drive itself does not comprise a function to detect degradation in the performance, and, which can realize a disk array apparatus which can change a detection level of the gradation in the performance to meet a request of a customer by.

The above-described and other objects as well as new features of the present invention will become clear by the following description in this application and by accompanying drawings.

Among various kinds of aspects of the invention disclosed in this application, the outlines of the typical aspects of the invention will be briefly explained as follows.

The present invention is applied to a disk array apparatus comprising: a plurality of storage devices by which writing or reading data is executed in such a way that, when there is caused an error in writing or reading data into or from a storage area, writing or reading data is repeated again after notifying that writing or reading data has been normally completed; storage device control sections which includes storing areas storing requests for write or read operations of data into or from the plurality of storage devices, controls the write or read operation of data into or from the plurality of storage devices, and receives notification that the write or read operation of data into or from the plurality of storage devices is normally completed; channel sections which receives a request for write or read operation from a network outside the disk array apparatus itself; a shared memory in which pieces of control information communicated by the channel control sections and the storage device control sections are stored; a cache memory in which pieces of data for communication between the channel control sections and the storage device control section are temporarily saved; and a connecting section connected to the channel control sections, the storage device control sections, the shared memory, and the cache memory, and a method for controlling the disk array apparatus. Moreover, the present invention has the following characteristics.

That is, in the disk array apparatus according to the present invention, the storage device control sections: generate logical storage areas using the storage areas in the plurality of storage devices, said logical storage areas being used for writing or reading data and having redundancy to store data; monitor the save areas in which a request for writing or reading data into or from the plurality of storage devices forming the logical storage areas is stored; and specify, among the plurality of storage devices forming the logical storage areas, a storage device, for which a number of repeated times is large and block the specified storage device.

Specifically, when the storage devices with a larger number of repeated times for writing or reading data are specified, the storage device control sections compare the write pending data sizes among the plurality of storage devices with the redundancy, and specify the storage device with larger write pending data size as one to be blocked. Or, the storage device control sections compare the average response times among the plurality of storage devices with the redundancy when the storage device with a larger number of repeated times for writing or reading data is specified, and specify the storage devices with larger average response time as one to be blocked. Or, the storage device control sections have areas which hold queue numbers for each of the plurality of storage devices, compare the queue numbers among the plurality of storage devices with the redundancy when the storage device with a larger number of repeated times for writing or reading data is specified, and specify the storage devices with larger average response time as one to be blocked.

The storage device control sections further comprise a management terminal connected to the connecting section, wherein the management terminal sets conditions for specifying, among the storage devices with the redundancy, the storage device with a larger number of repeated times for writing or reading data. The setting conditions are the number of repeated times for writing or reading data, a differential multiple of an amount of a piece of write pending data in the cache memory to be written into the storage devices, a differential multiple of an average response time for each of the plurality of storage devices, a differential multiple of a queue number for each of the plurality of storage devices.

Advantages obtained by the typical aspects, among the aspects of the present invention disclosed in the present application will be briefly explained as follows.

According to the present invention, a disk drive with degradation in the performance can be detected even if the disk drive itself does not comprise a function to detect degradation in the performance. Furthermore, a disk array apparatus which meets requirements of a customer can be realized by changing a detection level of the gradation in the performance.

BRIEF DESCRIPTIONS OF THE DRAWINGS

FIG. 22 is a view showing a setting screen for changing a detection level of the performance delay in the disk-array apparatus according to the one embodiment of the present invention;

FIG. 23 is a view showing correspondences between the detection levels and differential coefficients in the disk array apparatus according to the one embodiment of the present invention;

Figures 24, 25:
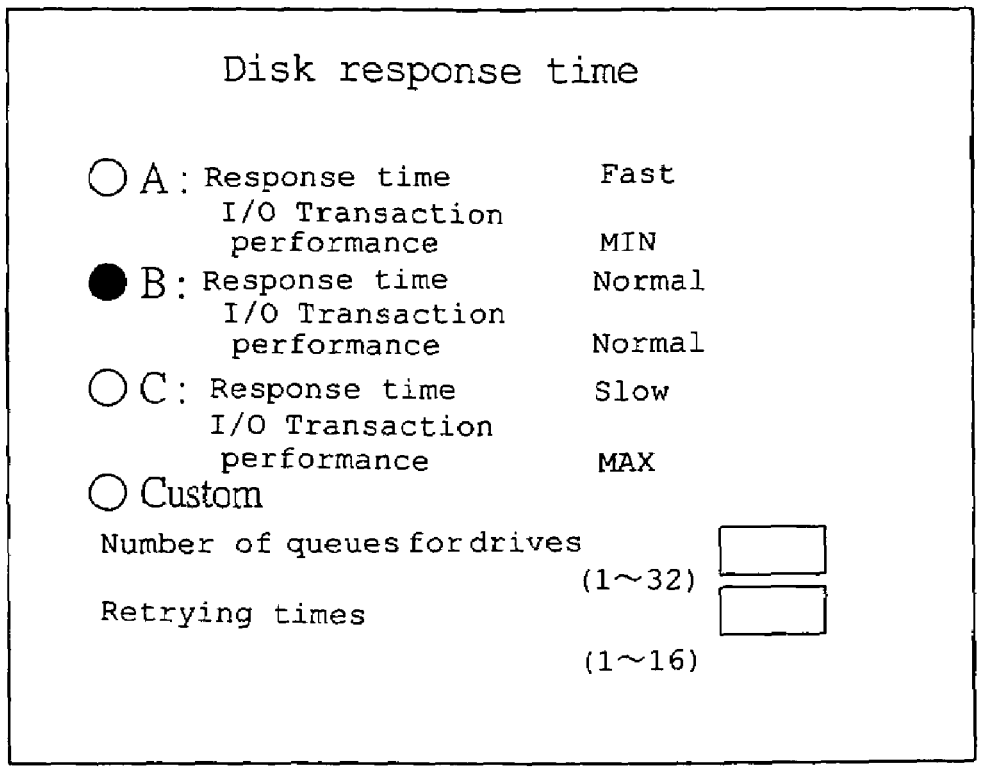

FIG. 24 is a view showing a setting screen for changing response times and the I/O transaction performance in the disk array apparatus according to the one embodiment of the present invention; and FIG. 25 is a view showing correspondences among the detection levels, the actual queue numbers, and the retrying times in the disk array apparatus according to the one embodiment of the present invention.

DESCRIPTION OF THE PREFERRED EMBODIMENTS

Hereinafter, embodiments according to the present invention will be explained, referring to drawings. Here, components having the same function will be denoted by the same reference numerals, and repeated explanation will be eliminated in all drawings for explaining the embodiments.

<Concept of the Present Invention>

The present invention is applied to a disk array apparatus comprising: a plurality of disk drives (storage devices) by which writing or reading data is executed in such a way that, when there is caused an error in writing or reading data into or from a storage area, writing or reading data is repeated again after notifying that writing or reading data has been normally completed; disk controllers (storage device control sections) which includes storing areas storing requests for write or read operations of data into or from the plurality of disk drives, controls the write or read operation of data into or from the plurality of disk drives, and receives notification that the write or read operation of data into or from the plurality of disk drives is normally completed; channel controllers (channel control sections) which receives a request for write or read operation from a network outside the disk array apparatus itself; a shared memory in which pieces of control information communicated by the channel controllers and the disk controllers are stored; a cache memory in which pieces of data for communication between the channel controllers and the disk controllers are temporarily saved; a switch (connecting section) connected to the channel controllers, the disk controllers, the shared memory, and the cache memory; and a service processor (management terminal) connected to the switch.

<Example for Whole Configuration of Disk Array Apparatus>

Figure 1:
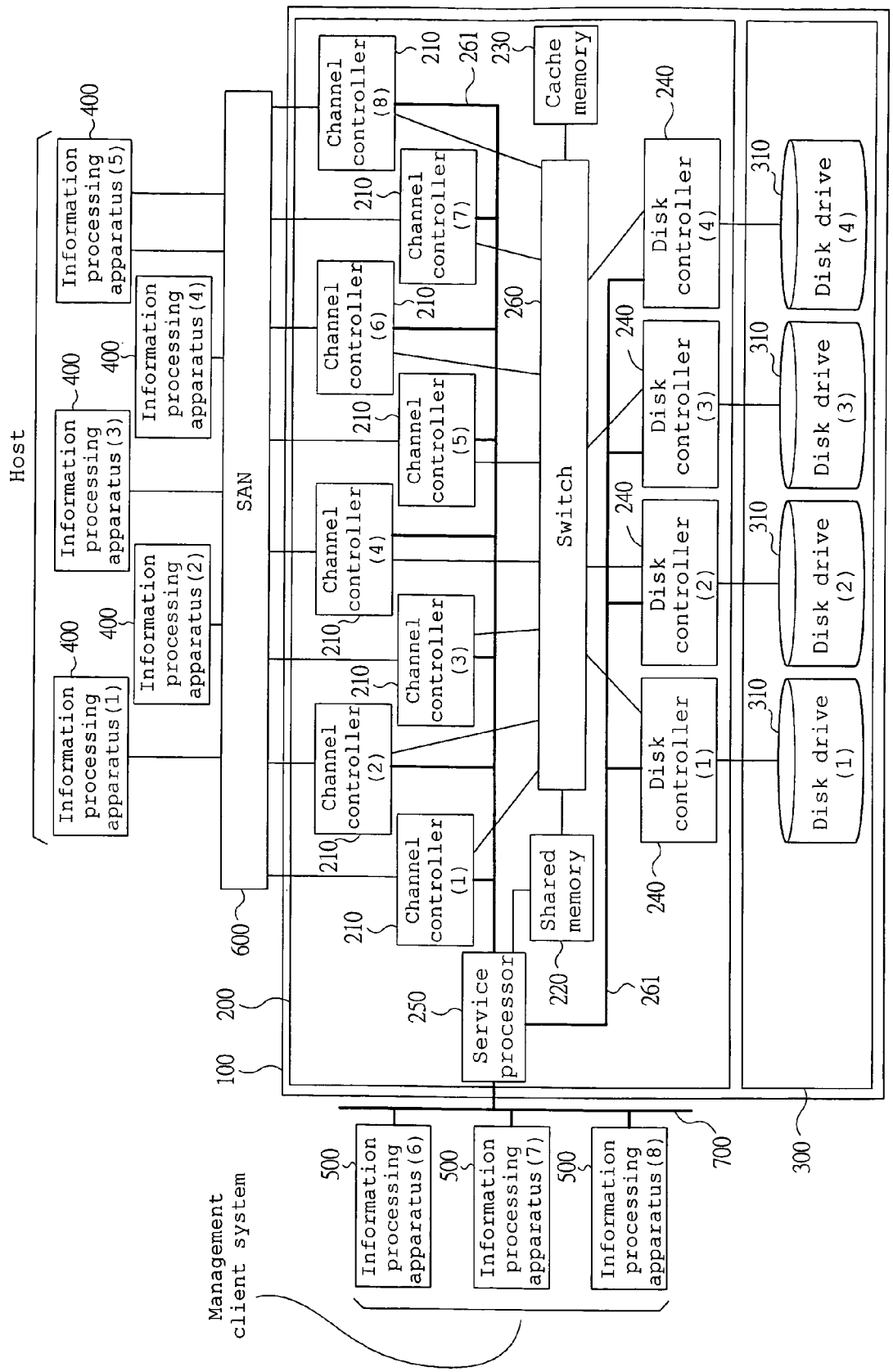
FIG. 1 is a configuration view showing a whole configuration of the disk array apparatus according to one embodiment of the present invention.

One example for a whole configuration of a disk array apparatus according to one embodiment according to the present invention will be explained, using FIG. 1. FIG. 1 is a configuration view showing the whole configuration of the disk array apparatus according to the present embodiment.

A disk array apparatus 100 according to the present embodiment is provided with a disk control apparatus 200 and a disk driving apparatus 300. The disk control apparatus 200 controls the disk driving apparatus 300, for example, according to a command received from information processing apparatuses 400 in a host system. For example, pieces of data stored in disk drives 310 provided in the disk driving apparatus 300 are read or pieces of data are written into the disk drives 310 for storing, based on data input-output requests received from the information processing apparatuses 400 in the host system. Moreover, the disk control apparatus 200 determines various kinds of settings for the disk array apparatus 100 according to various kinds of commands, which have been received, for example, from information processing apparatuses 500 in a management client system, to manage the disk array apparatus 100.

The information processing apparatuses 400 and 500 in the host system and in the management client system are information technology equipment such as a computer provided with a central processing unit (CPU) and memories, respectively. Various kinds of functions are realized by executing various kinds of programs through the CPU provided in the information processing apparatuses 400 and 500. The information processing apparatuses 400 and 500 may be, for example, a personal computer, a workstation, or a mainframe computer, respectively. Especially, the information processing apparatuses 400 in the host system are used as a main computer, for example, in an automatic teller system of a bank or in a seat reservation system of an airline, respectively. Moreover, the information processing apparatuses 500 in the management client system are used as a management computer for maintaining and managing the disk array apparatus 100, respectively.

Here, the information processing apparatuses 400 and 500 in the host system and in the management client system can be configured to be for different users, respectively. For example, there can be a configuration in which the information processing apparatuses (1), (2) 400 in the host system, and the information processing apparatuses (6) 500 in the management client system are for a user A, and the information processing apparatuses (3) through (5) 400 in the host system, and the information processing apparatus (7) 500 in the management client system are for a user B. Moreover, the information processing apparatus (8) 500 in the management client system can be configured to be an information processing apparatus for a manager which manages the whole disk array apparatus 100. Here, the users can be configured to be, for example, an enterprise, a department such as a unit in the enterprise, or individuals.

In FIG. 1, the information processing apparatuses 400 in the host system are connected to the disk control apparatus 200 through a storage area network (SAN) 600 so that the apparatuses 400 can communicate with the apparatus 200. The SAN 600 is a network in which data is exchanged between the information processing apparatuses 400 in the host system and the disk driving apparatus 300, using a block, which is a management unit for data in storage resources provided in the apparatus 300, as a unit. Communication between the information processing apparatuses 400 in the host system and the disk control apparatus 200 through the SAN 600 can be realized according to, for example, a protocol related with a fiber channel.

Obviously, the information processing apparatuses 400 in the host system and the disk control apparatus 200 are configured not necessarily to be connected to each other through the SAN 600. For example, there can be another configuration in which they are connected to each other through a local area network (LAN), or the apparatuses 400 is directly connected to the apparatus 200 not through a network. When they are connected to each other through the LAN, communication can be configured to be realized according to, for example, Transmission Control Protocol/Internet Protocol (TCP/IP). And, in the case of the direct connection without the network, communication is configured to be executed according to a communication protocol such as Fibre Connection (FICON) (a registered trademark), Enterprise System Connection (ESCON) (a registered trademark), Advanced Connection Architecture (ACONARC) (a registered trademark), and Fibre Connection Architecture (FIBARC) (a registered trademark).

Moreover, the information processing apparatuses 500 in the management client system are connected to the disk control apparatus 200 through a LAN 700. The LAN 700 can be assumed to be the Internet, or a dedicated network. Communication between the information processing apparatuses 500 in the management client system and the disk control apparatus 200 through the LAN 700 can be configured to be performed according to, for example, the TCP/IP protocol.

<<Disk Driving Apparatus>>

The disk driving apparatus 300 is provided with a number of the disk drives 310. Thereby, a mass storage area can be provided for the information processing apparatuses 400 in the host system, and the information processing apparatuses 500 in the management client system. The disk drives 310 can be configured to comprise a data storage medium such as a hard disk drive, or a plurality of hard disk drives forming a redundant arrays of inexpensive disks (RAID). Moreover, logical volumes which are a logical record area can be set in a physical volume, which is a physical storage area, in the disk drives 310.

The disk control apparatus 200 and the disk driving apparatus 300 can be assumed directly to be connected as shown in FIG. 1, or to be connected through a network. Moreover, the disk driving apparatus 300 can be configured to be integrated into the disk control apparatus 200 as one unit.

<<Disk Control Device>>

The disk control apparatus 200 comprises: channel controllers 210; a shared memory 220; a cache memory 230; disk controllers 240; a service processor 250; and a switch 260. Communication between the disk control apparatus 200 and the information processing apparatuses 400 in the host system is executed through the SAN 600 by the channel controllers 210.

The channel controllers 210 are provided with an communication interface for communication with the information processing apparatuses 400 in the host system and the information processing apparatuses 500 in the management client system, and with a function by which commands for data input-output between the information processing apparatuses 400 and 500 in the host and management client systems.

The channel controllers 210 are connected to the service processor 250 through an internal LAN 261, respectively. Thereby, micro programs and the like which are executed in the channel controllers 210 can be sent from the service processor 250 to the controllers 210 for installing.

The channel controllers 210, the shared memory 220, the cache memory 230, the disk controllers 240, and the service processor 250 are mutually connected to one another through the switch 260. Exchange of pieces of data or commands among the channel controllers 210, the shared memory 220, the cache memory 230, the disk controllers 240, and the service processor 250 is performed through the switch 260. The switch 260 comprises, for example, a crossbar switch.

The shared memory 220 and the cache memory 230 are storage memories for shared use among the channel controllers 210 and the disk controllers 240. The shared memory 220 is mainly used for storing pieces of control information and commands, and, on the other hand, the cache memory 230 is primarily used for storing data.

For example, when a request for data input-output, which one of the channel controller 210 has received from one of the information processing apparatuses 400 in the host system, is a write command, the related channel controller 210 writes the write command into the shared memory 220 and writes the write data received from the related information processing apparatus 400 in the host system into the cache memory 230. On the other hand, the disk controllers 240 monitors the shared memory 220, and, when it is detected that the write command has been written into the shared memory 220, the write data is read from the cache memory 230 according to the write command to write the write data into a related disk drive 310 in the disk driving apparatus 300.

And, when a request for data input-output, which one of the channel controllers 210 has received from one of the information processing apparatuses 400 in the host system, is a read command, it is checked whether data to be read exists in the cache memory 230. Here, when there is the data to be read in the cache memory 230, the related channel controller 210 sends the data to the related information processing apparatus 400 in the host system. On the other hand, when there is no data to be read in the cache memory 230, the related channel controller 210 writes the read command into the shared memory 220 and monitors the shared memory 220. When a related disk controller 240 detects that the read command has been written into the shared memory 220, the related controller 240 reads the objected data from a related disk drive 310 in the disk driving apparatus 300, and writes the data into the cache memory 230 as well as writes into the shared memory 220 as so. And, when a related channel controller 210 detects that the data to be read has been written into the cache memory 230, the data is sent to a related information processing apparatus 400 in the host system.

As described above, data is exchanged through the cache memory 230 between a related channel controller 210 and a related disk controller 240, and the data which is read or written by the related channel controller 210 and the related disk controller 240, among pieces of data stored in the disk drives 310, is stored in the cache memory 230.

Here, other than a configuration in which an instruction for data read or write is given from one of the channel controllers 210 to the disk controllers 240 through the shared memory 220 in an indirect manner, there can be applied, for example, another configuration in which an instruction for data read or write is directly given from one of the channel controller 210 to the disk controllers 240 not through the shared memory 220. And, there can be applied a further another configuration in which a function as a disk controller 240 is provided to a channel controller 210, and the controller 210 is treated as a control section for data input-output.

The disk controllers 240 are connected to a plurality of the disk drives 310 which stores data so that the controllers 240 can communicate with the drives 310, and the disk driving apparatus 300 is controlled by the controllers 240. Data is read or written from or into the disk drive 310, for example, as described above, according to a request for data input-output which the channel controller 210 has received from the information processing apparatuses 400 in the host system.

The disk controllers 240 and the service processor 250 are connected to one another through the internal LAN 261 for mutual communication with one another. Thereby, micro programs and the like to be executed in the disk controllers 240 can be sent from the service processor 250 to the controllers 240 for installing.

Though the shared memory 220 and the cache memory 230 have been independently provided from the channel controllers 210 and the disk controllers 240 in the present embodiment, the present invention is not limited to the above embodiment. Preferably, each channel controller 210 and each disk controller 240 separately comprise a function as the shared memory 220 or the cache memory 230, respectively, in such a way that the shared memory 220 or the cache memory 230 are distributed into each channel controller 210 and each disk controller 240, respectively. In this case, the channel controllers 210 and the disk controllers 240, which have a function as the distributed shared memory 220 and the distributed cache memory 230, are mutually connected to one another through the switch 260.

Moreover, there can be also applied still another configuration in which at least any one of combinations of the channel controllers 210, the disk controllers 240, the switch 260, the shared memory 220, and the cache memory 230 is integrated into one component.

The service processor 250 is a computer for maintenance and management of the disk array apparatus 100. By operating the service processor 250, an operator can execute, for example, setting of the configuration of the disk drives 310 in the disk driving apparatus 300, setting of a communication path among the information processors 400 in the host system, the information processors 500 in the management client system, and the channel controllers 210, setting of the logical volumes, and installation of micro programs which are executed in the channel controllers 210 or the disk controllers 240, and the like. Here, setting of the configuration of the disk drives 310 in the disk driving apparatus 300 means, for example, increasing or decreasing of the number of the disk drives 310, or changing in the RAID configuration (for example, changing from RAID 1 to RAID 5).

Furthermore, with using the service processor 250, operations such as confirmation of an operation state of the disk array apparatus 100, identification of a defective part, and installation of an operating system which is executed in the channel controllers 210 can be executed. The above-described settings and controls can be executed by an operator and the like, using a user interface provided in the service processor 250, or a user interface, which displays a Web page provided by a Web server operated by the service processor 250, of the information processing apparatuses 500 in the management client system. By operating the service processor 250, an operator and the like can execute setting of kinds or contents of malfunctions to be monitored, or determination of destinations for notifying the malfunctions.

The service processor 250 can be configured to be provided in the disk control apparatus 200 internally, or externally. Moreover, the service processor 250 can be configured to be a dedicated computer for maintenance and management of the disk control apparatus 200 and the disk driving apparatus 300, or a general-purpose computer with maintenance and management functions.

<Configuration Example for External Appearance of Disk Array Apparatus>

Figure 2:
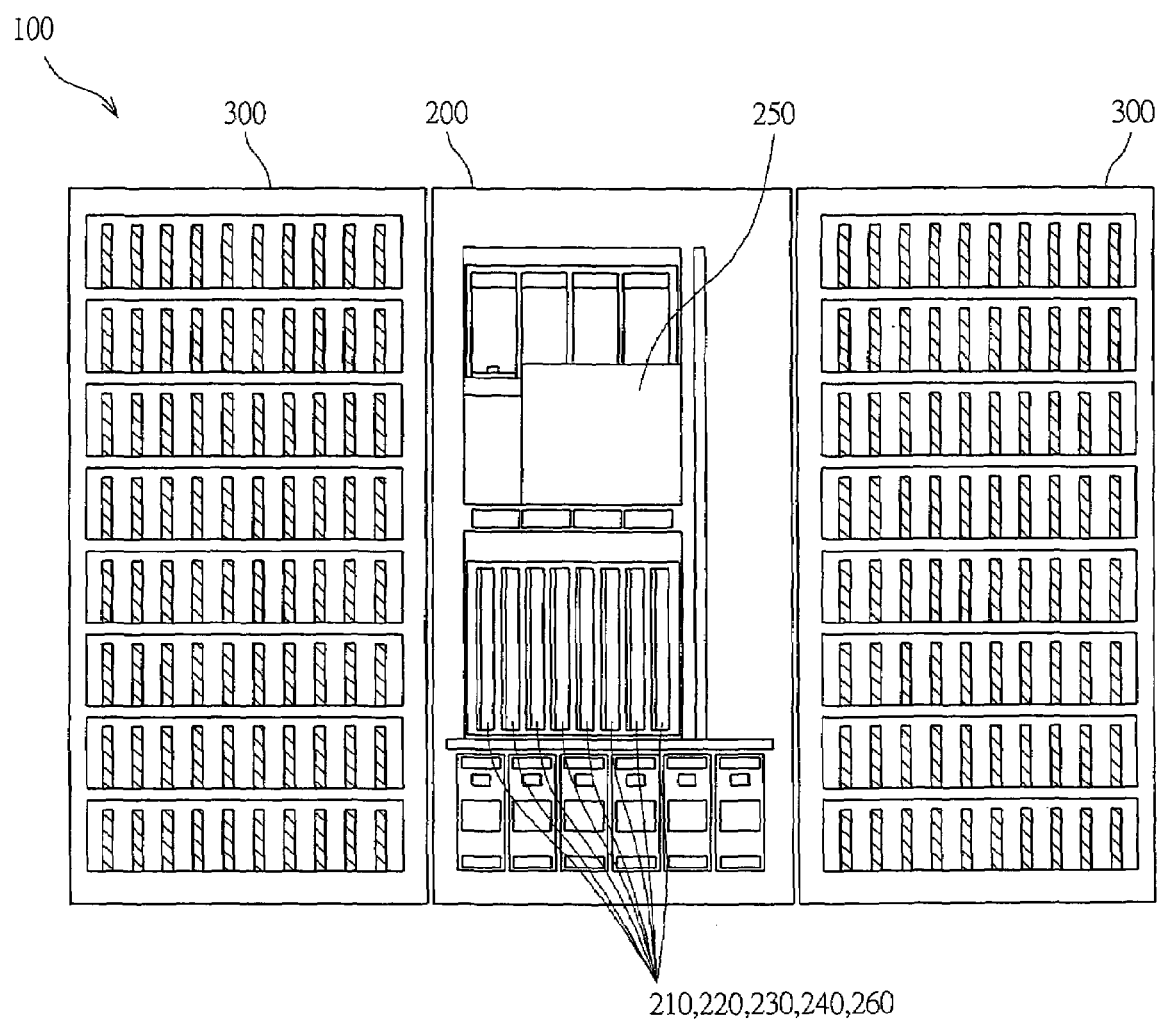
FIG. 2 is a view showing a configuration for the external appearance of the disk array apparatus according to the one embodiment of the present invention.
Figure 3:
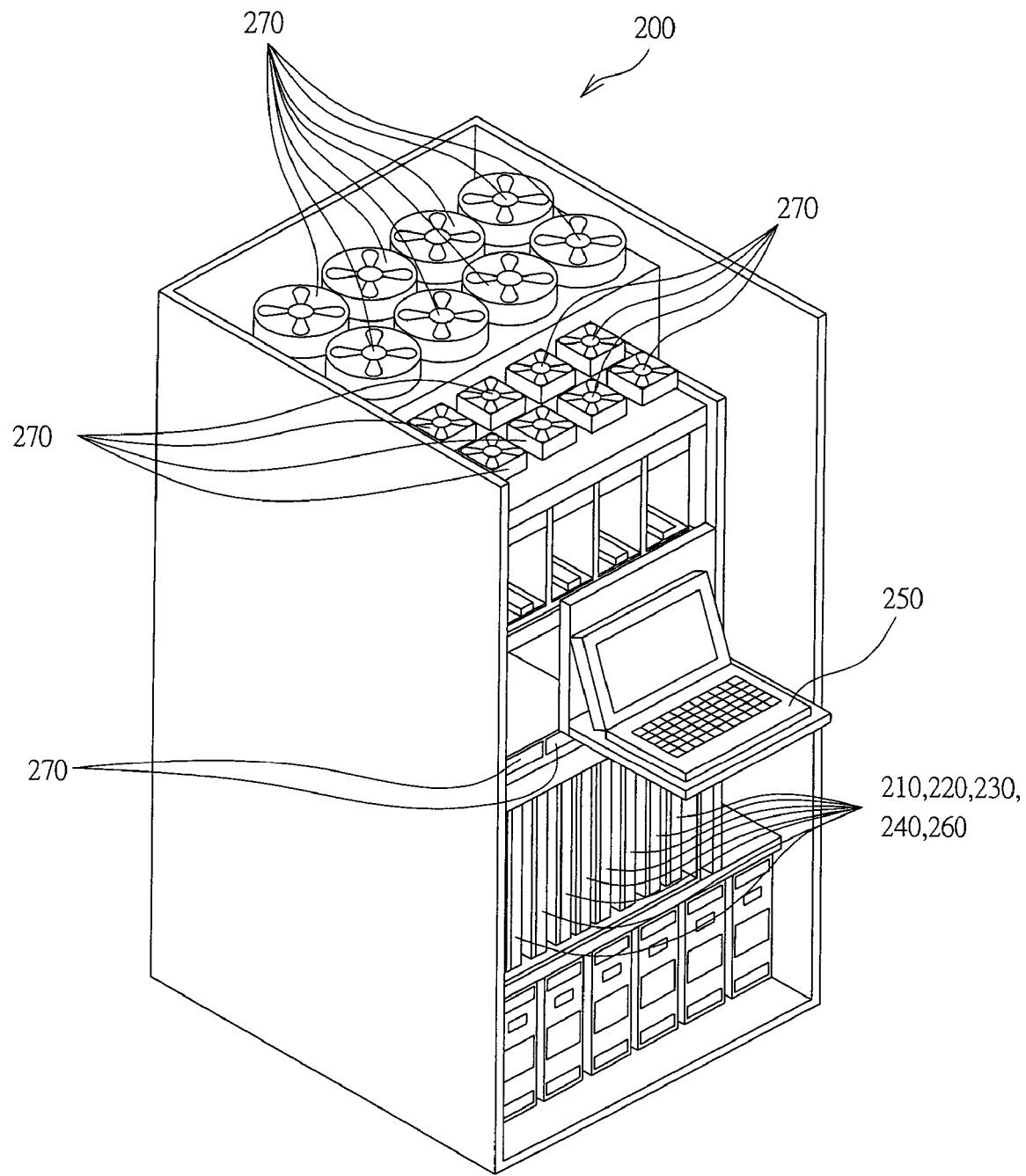
FIG. 3 is a view showing a configuration for the external appearance of a disk control device in the disk array apparatus according to the one embodiment of the present invention.

Referring to FIGS. 2 and 3, one configuration example of the external appearance of the disk array apparatus according to the one embodiment of the present invention will be explained. FIG. 2 is a view showing a configuration for the external appearance of the disk array apparatus according to the present embodiment; and FIG. 3 is a view showing a configuration for the external appearance of a disk control apparatus.

As shown in FIG. 2, the disk array apparatus 100 according to the present embodiment has a configuration in which the disk control apparatus 200 and the disk driving apparatus 300 are configured to be contained in each cabinet, respectively. In the example shown in FIG. 2, the cabinets of the disk driving apparatuses 300 are arranged on either side of the cabinet of the disk control apparatus 200.

The service processor 250 is provided at the center front part of the disk control apparatus 200. The service processor 250 is covered with a cover, and, as shown in FIG. 3, the service processor 250 can be used by opening the cover. Here, the service processor 250 shown in FIG. 3 has a form of a so-called note type personal computer, but the processor 250 can have any type of forms.

Below the service processor 250, slots are provided for installing the channel controllers 210, the disk controllers 240, the cache memory 230, the shared memory 220, and the switch 260. The channel controllers 210, the disk controllers 240, the cache memory 230, the shared memory 220, and the switch 260 are provided on a circuit board to form a board, respectively, and these boards are installed into each slot. Each slot is provided with a guide rail for installing the above-described boards. The channel controllers 210, the disk controllers 240, the cache memory 230, the shared memory 220, and the switch 260 can be installed into the disk control apparatus 200 by inserting each board into the slot along the guide rail. Connectors for connecting each board to the disk control apparatus 200 are provided at the back front part of each slot.

Moreover, in the disk control apparatus 200, there are provided fans 270 which discharge heat generated from the channel controllers 210, the disk controllers 240, and the like. The fans 270 are provided on the upper surface of the disk control apparatus 200, and, in addition, on the upper part of the slots.

<Examples of Specific Configuration and Operation Principle of Disk Array Apparatus>

Figure 4:
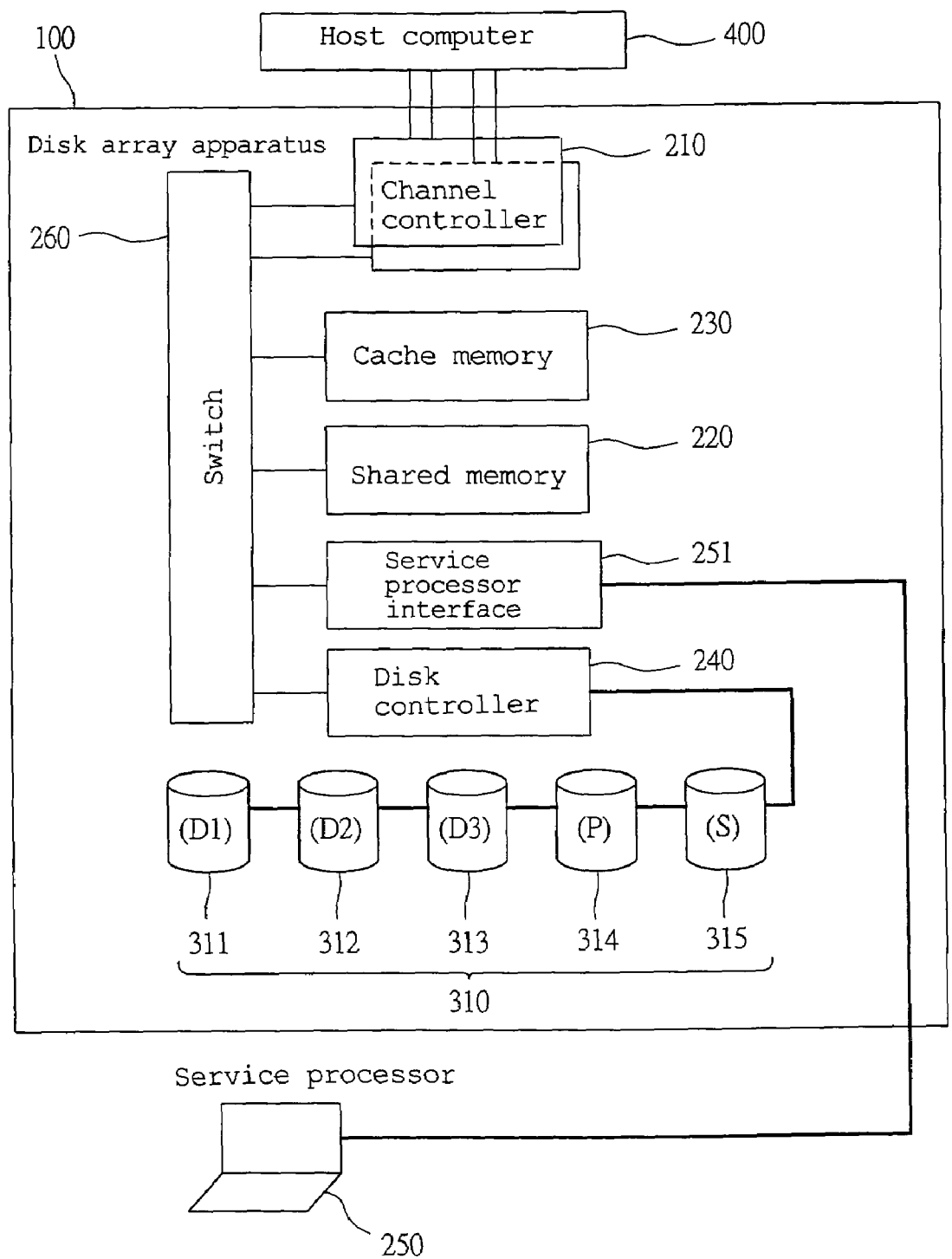
FIG. 4 is a view showing the specific configuration of the disk array apparatus according to the one embodiment of the present invention.
Figure 5:
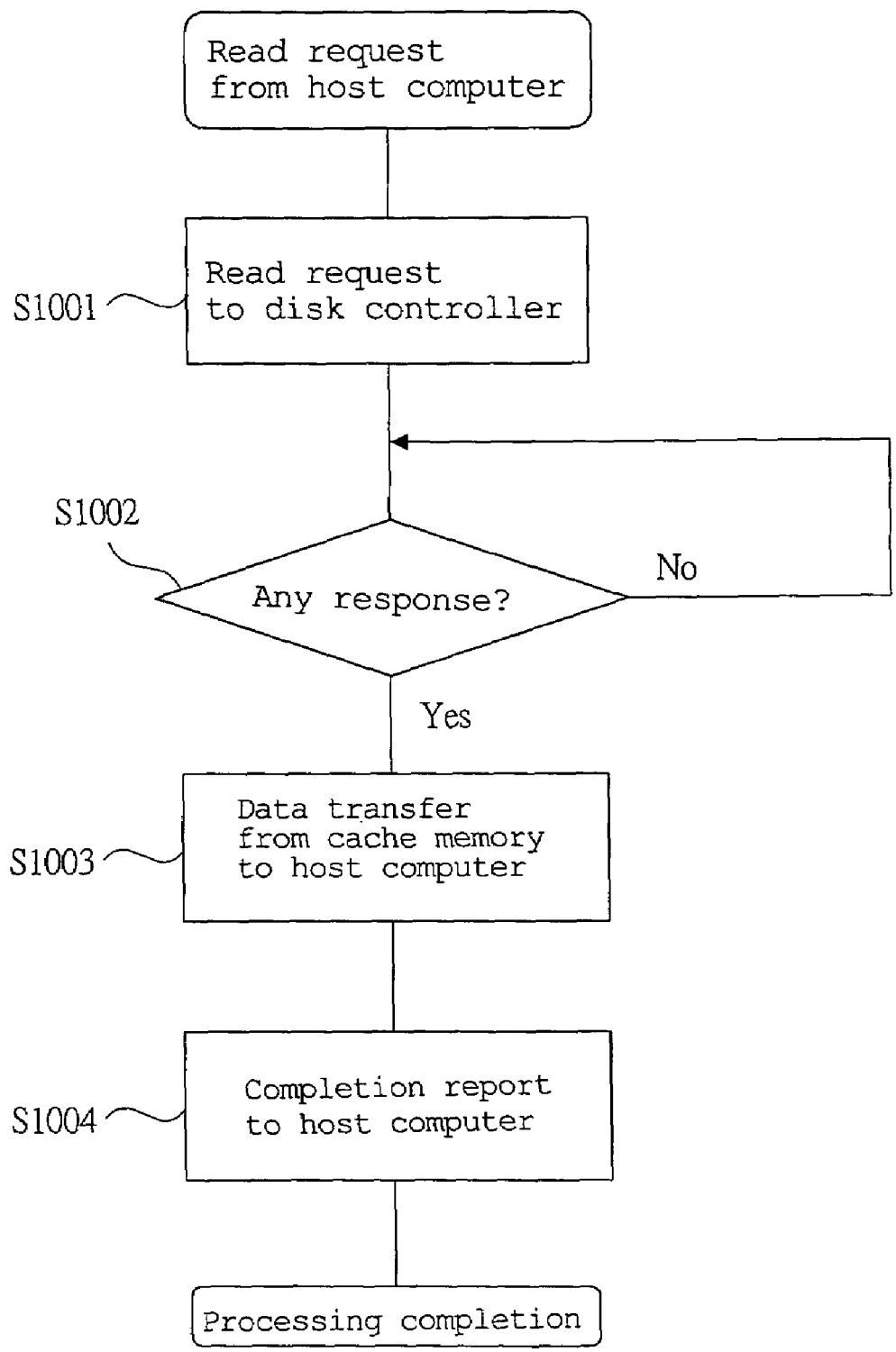
FIG. 5 is a flow diagram showing operations of channel controllers when a read request is input from a host computer in the disk array apparatus according to the one embodiment of the present invention.
Figure 6:
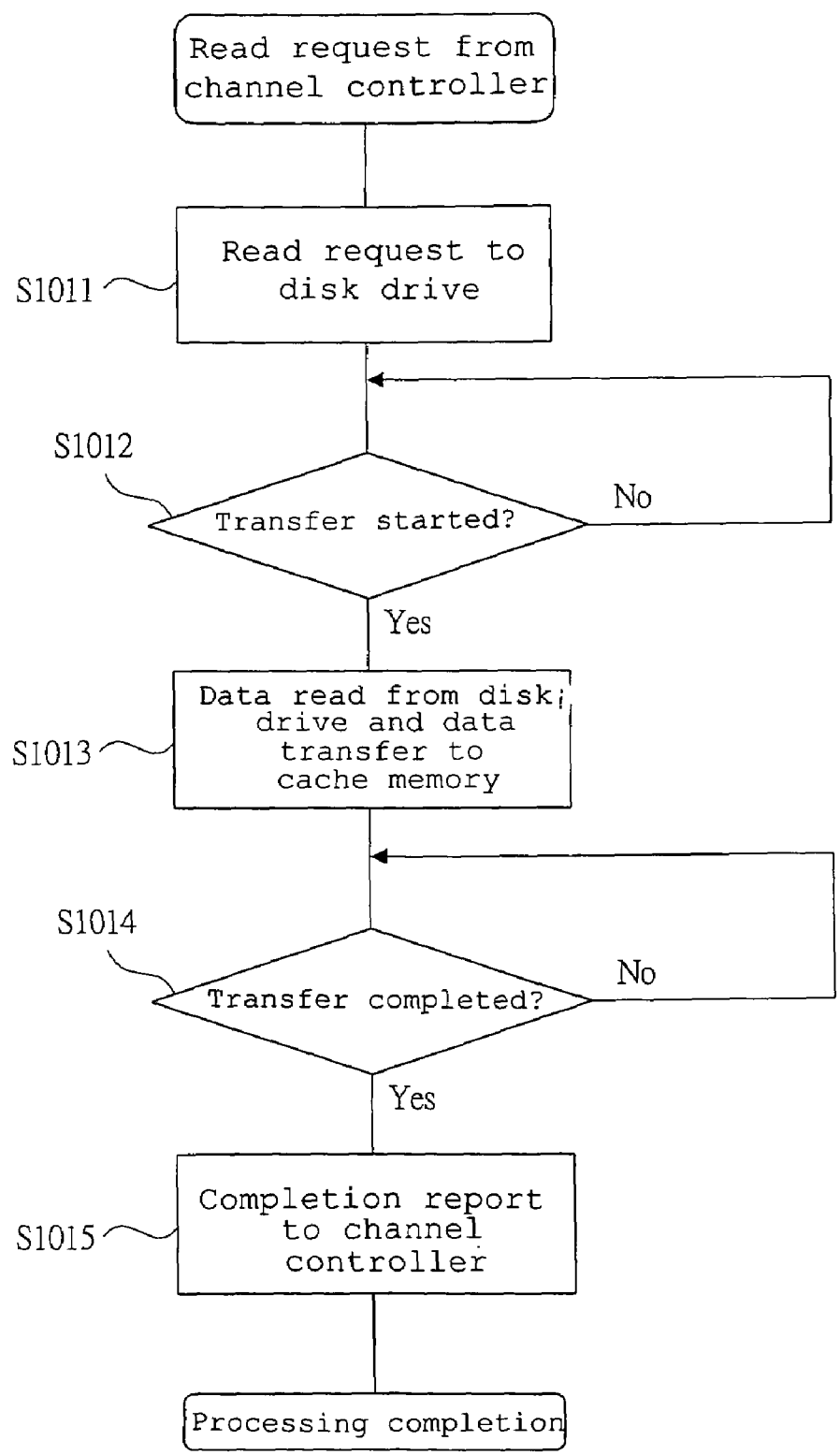
FIG. 6 is a flow diagram showing operations of disk controllers when a read request is input from the channel controllers in the disk array apparatus according to the one embodiment of the present invention.
Figure 7:
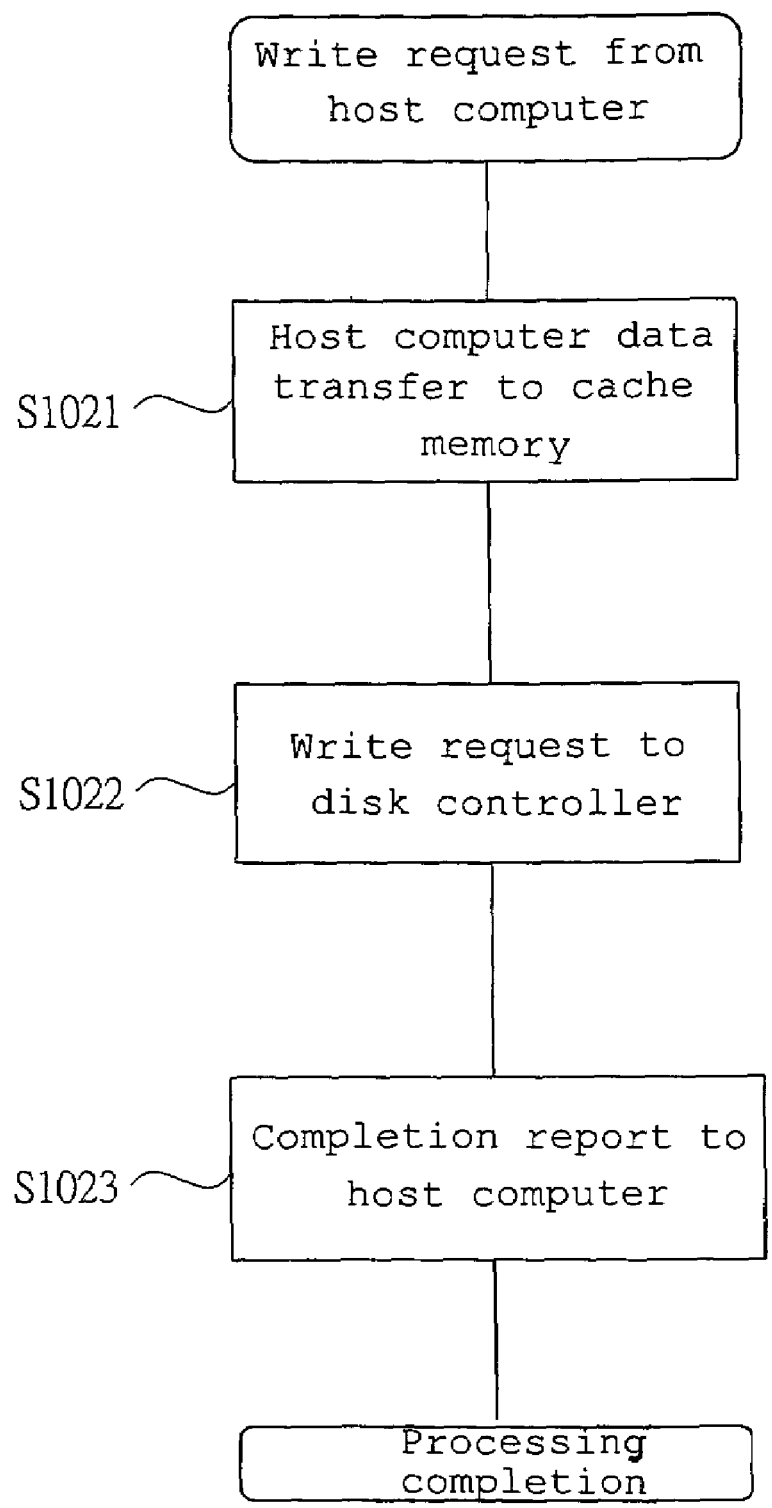
FIG. 7 is a flow diagram showing operations of the channel controllers when a write request is input from the host computer in the disk array apparatus according to the one embodiment of the present invention.
Figure 8:
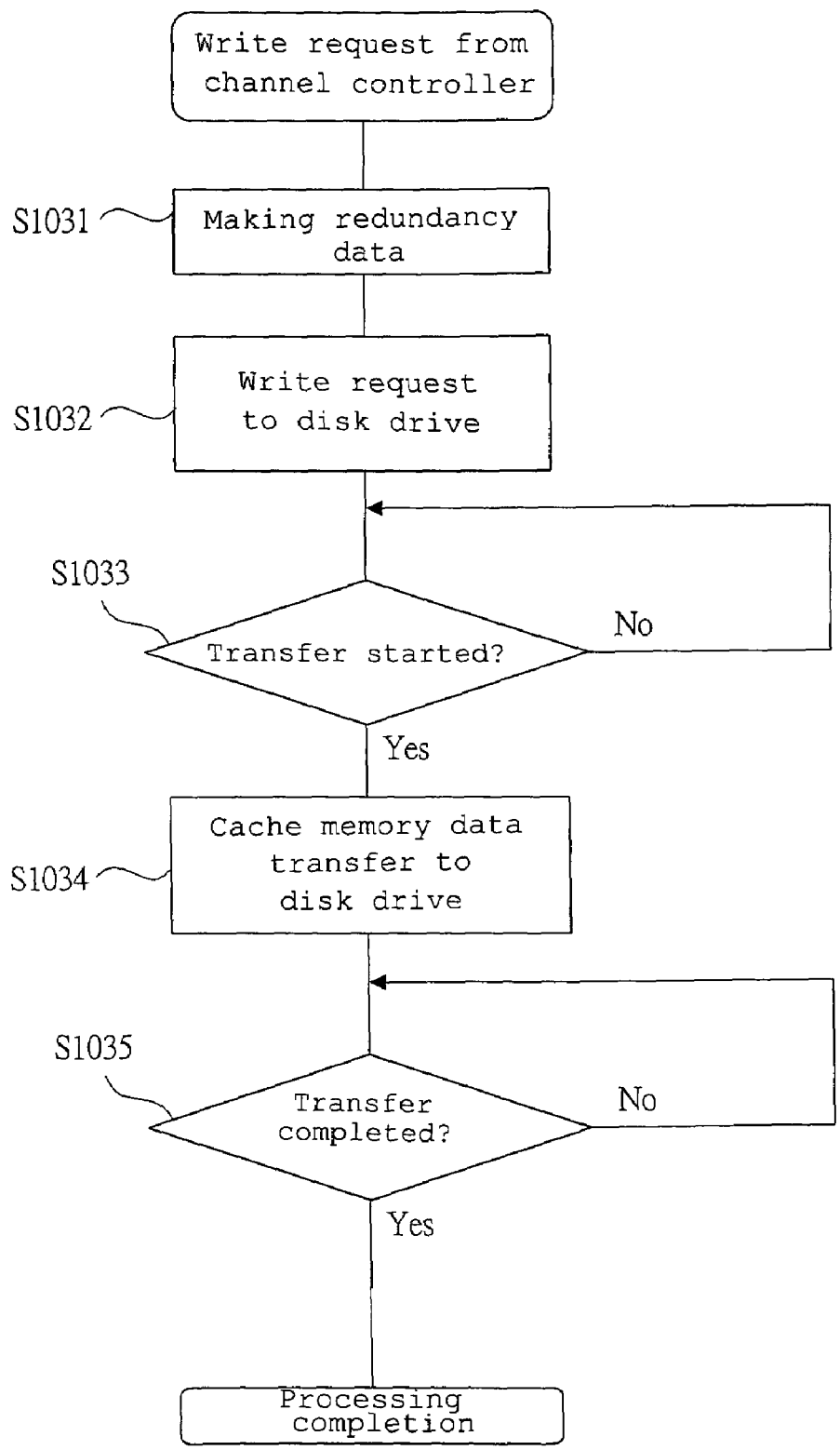
FIG. 8 is a flow diagram showing operations of the disk controllers when a write request is input from the channel controllers in the disk array apparatus according to the one embodiment of the present invention.

One example of a specific configuration and that of an operation principle of the disk array apparatus according to the one embodiment of the present invention will be explained, referring to FIGS. 4 through 8. FIG. 4 is a view showing the specific configuration of the disk array apparatus according to the present embodiment; FIG. 5 is a flow diagram showing operations of the channel controllers when a read request is input from the host computer; FIG. 6 is a flow diagram showing operations of the disk controllers when a read request is input from the channel controllers; FIG. 7 is a flow diagram showing operations of the channel controllers when a write request is input from the host computer; and FIG. 8 is a flow diagram showing operations of the disk controllers when a write request is input from the channel controllers.

Specifically, the disk array apparatus 100 according to the present embodiment is applied to a disk subsystem, and comprises, as shown in FIG. 4: the channel controllers which are connected to a host computer (an information processing apparatus in the host system) 400 and are provided with a host interface; the shared memory 220; the cache memory 230; the disk controllers 240 provided width a disk drive interface such as an FC-AL (Fibre Channel-Arbitrated Loop) interface; a service-processor interface 251 for connection to the service processor 250; the switch 260; the disk drives 310 and the like.

The disk drives 310 comprises disk drives 311 through 315 in FIG. 4 as one example, and the disk drive (D1) 311, the disk drive (D2) 312, the disk drive (D3) 313, and the disk drive (P) 314 have redundancy, using a RAID configuration. The disk drives (D1) through (D3) are provided for storing data, the disk drive (P) is installed for storing parity information, and the disk drive (S) is prepared as a backup drive.

Moreover, the service processor 250 is externally connected to the disk subsystem through the service processor interface 251 in FIG. 4.

In the disk subsystem of the present embodiment, more particularly, the disk drives 310 (311 through 315) have a function by which writing or reading data is executed in such a way that, when there is caused an error in writing or reading data into or from the storage area, writing or reading data is repeated again after notifying that writing or reading data has been normally completed.

Moreover, the disk controllers 240 comprise storing areas in which requests for data write or read into or from the plurality of disk drives 310, and have the following functions: to control writing or reading data into or from the plurality of the disk drives 310; to receive the notifications from the plurality of the disk drives 310, that writing or reading data into or from the plurality of the disk drives 310 has been normally completed; to generate logical storage areas which are used, especially, for writing or reading data, have redundancy capable of storing data, using the storage areas of the plurality of disk drives 310; to monitor the storing areas in which a request for writing or reading data into or from the plurality of disk drives 310 forming the logical storage areas is stored; and to specify, among the plurality of the disk drives 310 forming the logical storage areas, a disk drive for which the number of repeated times is large and block the specified disk drive.

Moreover, the channel controllers 210 have a function by which requests for write or read operations are received from a network outside the disk array apparatus itself. The shared memory 220 has an area in which control information communicated by the channel controllers 210 and the disk controllers 240 is stored. The cache memory 230 includes an area in which data for communication between the channel controllers 210 and the disk controllers 240 is temporarily saved. The switch 260 is connected to the channel controllers 210, the disk controllers 240, the shared memory 220, and the cache memory 230.

The service processor 250 has a function by which conditions for specifying, among the plurality of the disk drives 310 with the redundancy, the disk drive with a large number of repeated times for writing or reading data are set.

The operations in the disk subsystem with such a configuration are as follows. One of the channel controllers 210 which has received a write data from the host computer 400 saves the data into the cache memory 230 and instructs the disk controllers 240 to write the write data in the cache memory 230 into the disk drives 311 through 314. And, the channel controller 210 which has received the request for data read from the host computer 400 instructs the disk controllers 240 to read the data from the disk drives 311 through 314 for transferring the data to the cache memory 230. The instructed disk controller 240 reads the data from the disk drives 311 through 314 for transferring the data to the cache memory 230, and, then, notifies the channel controllers 210 that the reading operation of the data has been completed. The channel controller 210 which has received the notification transfers the data from the cache memory 230 to the host computer 400. Specifically, the operations will be performed as follows.

Specifically, as shown in FIG. 5, the operations of the channel controllers 210 when a read request is input from the host computer 400 are to give the read request to the disk controllers 240 through the switch 260 at a step S1001. Then, the response of a related disk controller 240 is monitored at a step S1002. When there is no response (No), the processing proceeds to the step S1002, and, when there is a response (Yes), the processing proceeds to a step S1003. At the step S1003, data in the cache memory 230 is read through the switch 260, and is transferred to the host computer 400. When transferring is completed, a completion report is notified to the host computer 400 at a subsequent step S1004.

As shown in FIG. 6, the operations of the disk controllers 240 when the read request is input from the channel controllers 210 are to give the read request to the disk drives 311 through 315 at a step S1011. Subsequently, it is monitored at a step S1012 whether transferring is started or not, and, when there is a request for starting the transferring (Yes), data in the disk drives 311 through 315 is read at a subsequent step S1013 for transferring the data to the cache memory 230 through the switch 260. It is monitored at a subsequent step S1014 whether transferring is completed or not, and, when the transferring is completed (Yes), a completion report is notified to the channel controllers 210 at a step S1015.

As shown in FIG. 7, the operations of the channel controllers 210 when a write request is input from the host computer 400 are transfer write data from the host computer 400 to the cache memory 230 at a step S1021. Then, at a step S1022, the write request is given to the disk controllers 240 through the switch 260, and a completion report is notified to the host computer 400 at a subsequent step S1023.

As shown in FIG. 8, the operations of the disk controllers 240 when there is a write request from the host computer 400 are to read from the cache memory 230 the data to be written through the switch 260 for generating redundancy data at a step S1031 and to write the generated redundancy data into another area in the cache memory 230 through the switch 260. Then, at a step S1032, a write request is given to the disk drives 311 through 315, and it is monitored at a subsequent step S1033 whether transferring is started or not. When there is a request for starting transferring (Yes), data in the cache memory 230 is transferred at a subsequent step S1034 to the disk drives 311 through 315. At a subsequent step S1035, it is monitored whether transferring is completed or not, and, when the transferring is completed (Yes), the processing is completed.

<Example of Input-Output Processing of Disk Array Apparatus>

Figure 9:
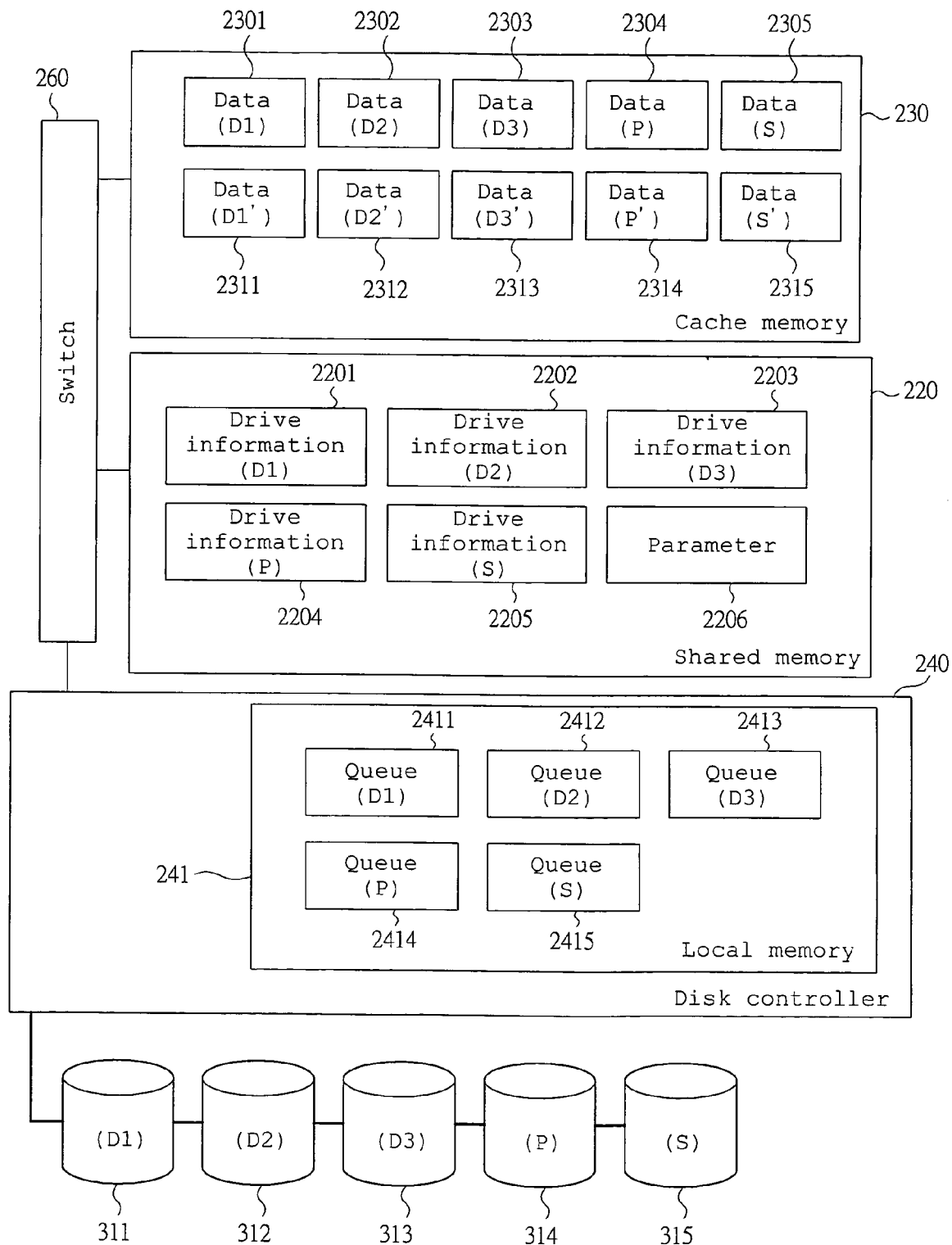
FIG. 9 is a view showing input-output processing for disk drives in the disk array apparatus according to the one embodiment of the present invention.

One example of input-output processing of the disk array apparatus according to the one embodiment of the present invention will be explained, referring to FIG. 9. FIG. 9 is a view showing the input-output processing for the disk drives.

In the input-output processing in the disk array apparatus, the following pieces of information are stored in the cache memory 230, the shared memory 220, and local memories 241 in the disk controllers 240, respectively.

In the cache memory 230, areas are provided, in which pieces of write pending data (D1) 2301, (D2) 2302, and (D3) 2303 to be written into the disk drives 311 through 313; a piece of redundancy data (P) 2304 to be written into the disk drive 314; and a piece of regeneration data (S) 2305 to be written into the backup disk drive 315 are stored respectively. Moreover, areas are provided in the cache memory 230, in which pieces of read data (D1') 2311, (D2') 2312, and (D3') 2313, (P') 2314, and (S') 2315, which have been read from the disk drives 311 through 315, respectively, are stored.

Areas are provided in the shared memory 220, in which pieces of drive information (D1) 2201, (D2) 2202, (D3) 2203, (P) 2204, and (S) 2205, on write pending data sizes of pieces of write pending data for the disk drives 311 through 315, and pieces of information on parameters 2206 for detecting degradation in the performance of the disk drives are stored respectively.

Areas are provided in the local memories 241 of the disk controllers 240, in which pieces of information on queues (D1) 2411, (D2) 2412, (D3) 2413, (P) 2414, and (S) 2415, corresponding to the disk drives 311 through 315 are stored respectively.

In FIG. 9, with regard to the input-output processing into-from the disk drives 311 through 313, data which is instructed by a related channel controller 210 to be written into the disk drives 311 through 313 is stored in the write pending data 2301 through 2303 corresponding to the disk drives 311 through 313 in the cache memory 230, and based on the above data, redundancy data 2304 to be written into the disk drive 314 is made. Then, the write pending data sizes are updated as the pieces of the drive information 2201 through 2204 in the shared memory 220.

The disk controller 240 is operated in such a way that, when writing of the instructed pieces of data into the disk drives 311 through 314 is completed, the pieces of write pending data 2301 through 2304 on the cache memory 230, corresponding to the disk drives 311 through 314, are abandoned to update the write pending data sizes in the pieces of drive information 2201 through 2204 within the shared memory 220.

For example, when there is a write instruction to the disk drive (D2) 312 and the drive information 2202 in the disk drive 312 is in a drive state that the information can not be used, the redundancy data 2304 is made to delete the write pending data 2302 and the write pending data size in the drive information 2202 without requesting for writing into the drive information 2202 in the disk drive 312.

Furthermore, as one example, when reading of a piece of data from the disk drive (D1) 311 is instructed and the drive information 2201 in the disk drive 311 is in a drive state that the information can not be used, the data is read from the disk drives 312 through 314 with redundancy to store the data in the pieces of read data 2312 through 2314 in the cache memory 230 and to regenerate the read data 2301 in the disk drive 311, using these stored pieces of data.

<Example of Queue Configuration>

Figure 10:
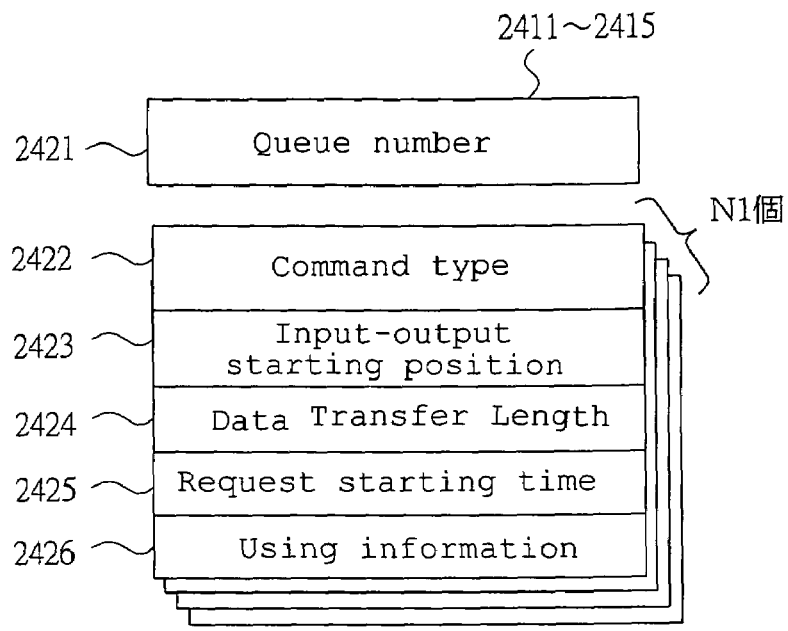
FIG. 10 is a view showing a configuration of queues in the disk array apparatus according to the one embodiment of the present invention.

Referring to FIG. 10, one example of queues for input-output processing will be explained, which are exchanged among the disk controllers and the disk drives in the disk array apparatus according to the one embodiment of the present invention. FIG. 10 is a view showing a configuration of the queues.

The queues 2411 through 2415 which are exchanged among the disk controllers 240 and the disk drives 311 through 315 and are corresponding the disk drives 311 through 315 are stored in the local memory 241 of the disk controllers 240. Each queue comprises a queue number 2421 showing a number of queues, and N1 sets of individual queues including: a command types 2422 showing a type of a command (READ, WRITE, and the like); an input-output starting position 2423 of Logical Block Address (LBA) showing position information by which a position in a related disk drive for input-output of data is determined; a data transfer length 2424 showing a transferred amount of the data at input-output; a request-starting time 2425 showing when input-output is requested; and use information 2426 by which it is judged whether a related queue can be used or not.

For example, when the disk controllers 240 make a READ or WRITE request to the disk drives 311 to 315 through an interface such as the FC-AL interface, the individual queues (the command type, the input-output starting position, the data transfer length, the request-starting time, and the use information) 2422 through 2426 for the queues 2411 through 2415 in each disk drive are registered to increment the queue number 2421. Moreover, when there is a response to the READ or WRITE request from the disk drives 311 through 315, the individual queues 2422 through 2426 of each of the corresponding queues 2411 through 2415 are deleted, and the queue number 2421 is decremented.

<Example of Configuration of Drive Information>

Figure 11:
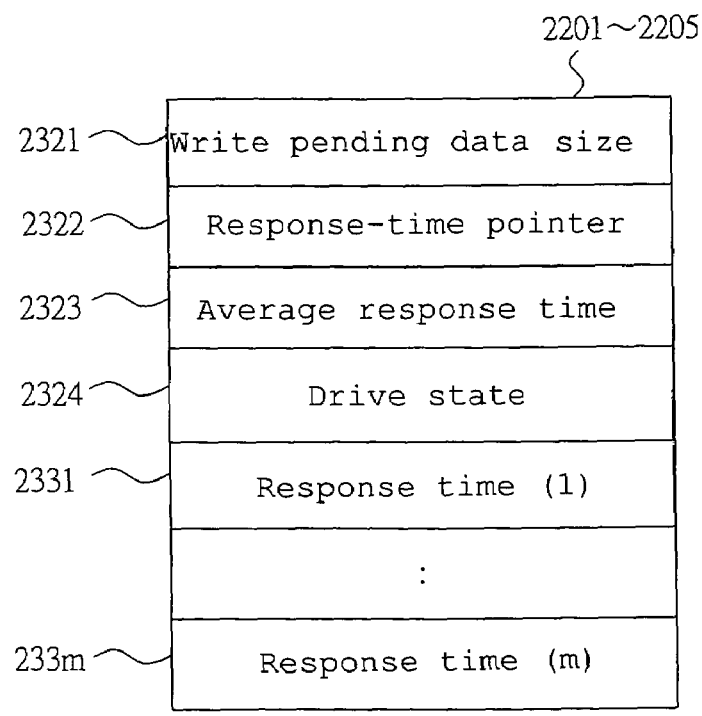
FIG. 11 is a view showing a configuration of pieces of drive information in the disk array apparatus according to the one embodiment of the present invention.
Figure 12:
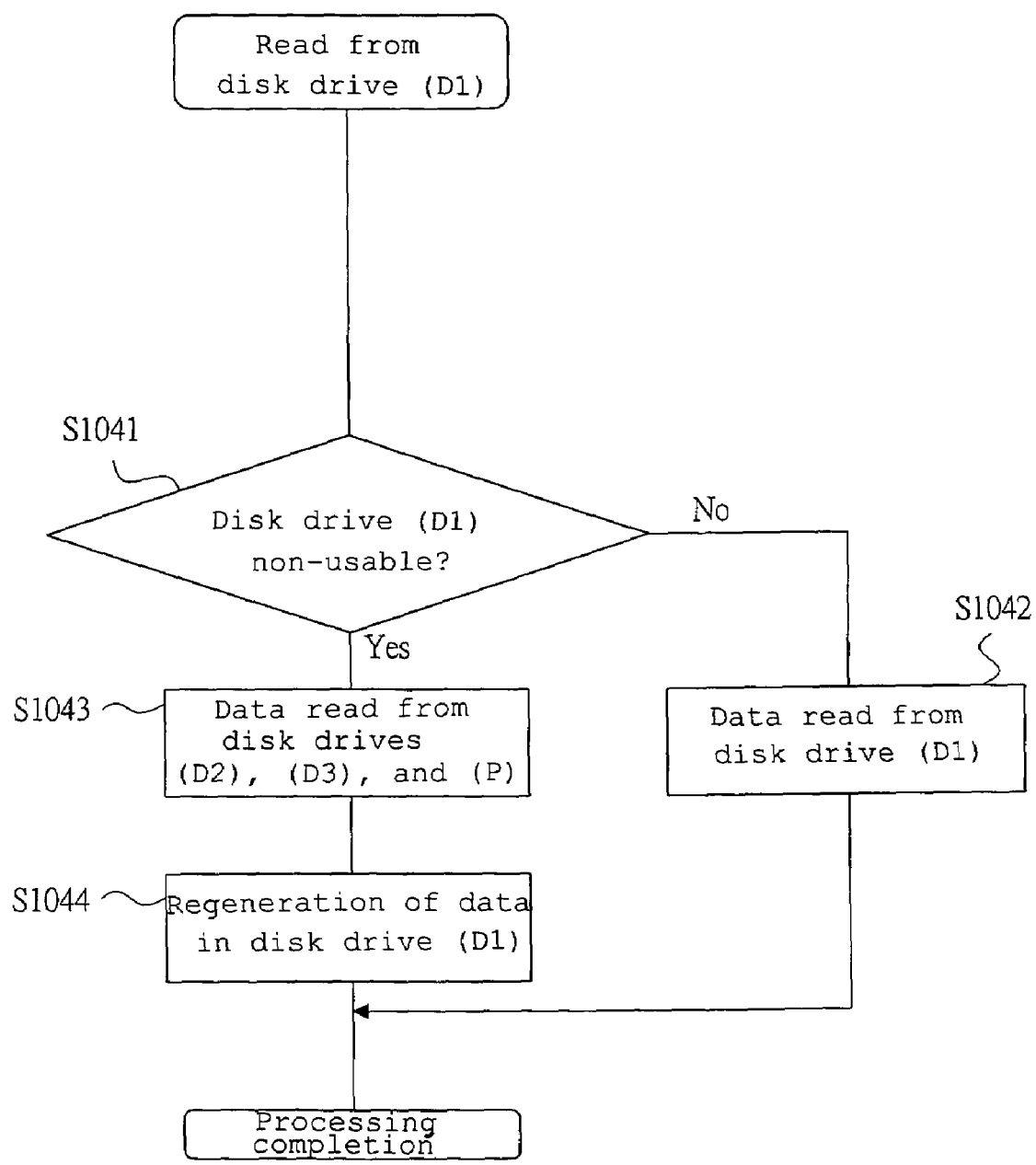
FIG. 12 is a flow diagram showing operations, by which reading is requested when a disk drive can not be used, in the disk array apparatus according to the one embodiment of the present invention.

One example of pieces of drive information stored in the shared memory of the disk array apparatus according to the one embodiment of the present invention will be explained, referring to FIGS. 11 through 13. FIG. 11 is a view showing a configuration of the pieces of drive information; FIG. 12 is a flow diagram showing operations by which reading is requested when a disk drive can not be used; and FIG. 13 is a flow diagram showing operations by which writing is requested when a disk drive can not be used.

As shown in FIG. 11, each of the drive information 2201 through 2205 stored in the shared memory 220 comprises: a write pending data size 2321 showing an amount of the write pending data in the cache memory 230 for writing into a related one of the disk drives 311 through 315; a response-time pointer 2322 showing a position of a response-time table; response time (1) 2331 through (m) 233$m$ showing a time between the request-starting time 2425 at which a request for input-output to the related one of the disk drives 311 through 315 is made and a time at which an response is actually received; an average response time 2323 showing the average of the response time 2331 through 233$m$; and a drive state 2324 showing whether the related disk drive can be used or not.

For example, as shown in FIG. 12, the operations for read request when the disk drive (D1) 311, among the disk drives 311 through 314 with a redundancy configuration, can not be used. It is judged at a step S1041 whether the disk drive 311 can be used or not, referring to the use information 2426 on the drive information 2201 in the shared memory 220. When it is judged that the drive 311 can be used (No), data is read from the disk drive (D1) 311 at a step S1042, and the data after reading is saved in the area for the read data (D1') 2311 on the cache memory 230. When it is judged at the step S1041 that the drive 311 can not be used (Yes), pieces of data are read from the other disk drives (D2) 312, and (D3) 313, and (P) 314 with the redundancy at a step S1043, and the pieces of data after reading are stored in the areas for the read data (D2') 2312, (D3') 2313, and (P') 2314, respectively. At a subsequent step S1044, the pieces of data in the disk drive (D1) 311 are regenerated form the above data to store them in the read data (D1') 2311 on the cache memory 230.

Figure 13:
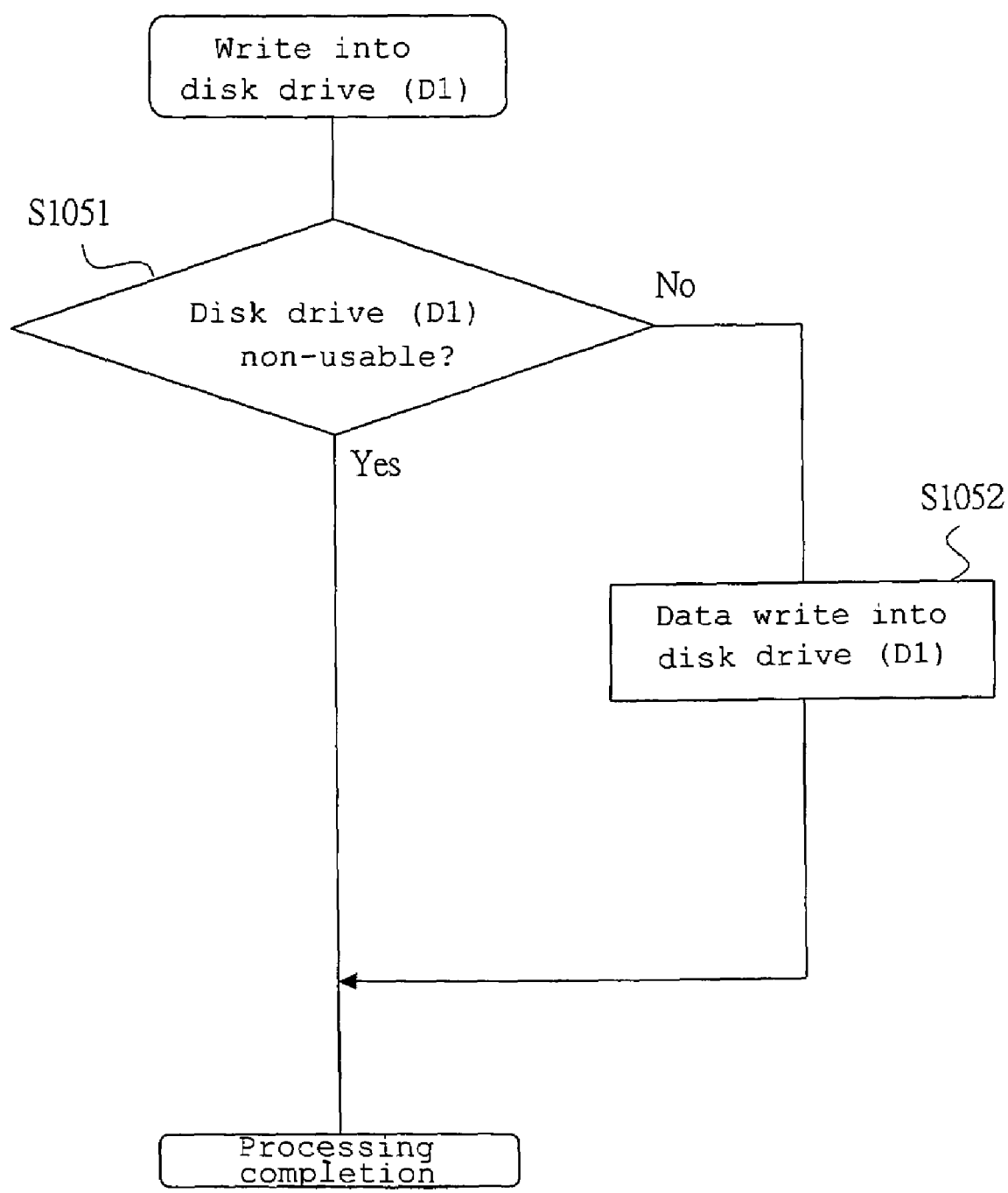
FIG. 13 is a flow diagram showing operations, by which writing is requested when a disk drive can not be used, in the disk array apparatus according to the one embodiment of the present invention.

Moreover, as one example as shown in FIG. 13, the operations of write request when the disk drive (D1) 311, among the disk drives 311 through 314 with a redundancy configuration, can not be used, and it is judged at a step S1051 whether the disk drive (D1) 311 can be used or not, referring to the use information 2426 in the drive information 2201 on the shared memory 220. When the drive 311 can be used (No), a piece of data is read from the write pending data (D1) 2301 in the cache memory 230 and is written into the disk drive (D1) 311 at a step S1052. When it is judged that the drive 311 can not be used (Yes), the processing is completed.

<Example of Detection of Degradation in Performance of Disk Drive>

Figure 14:
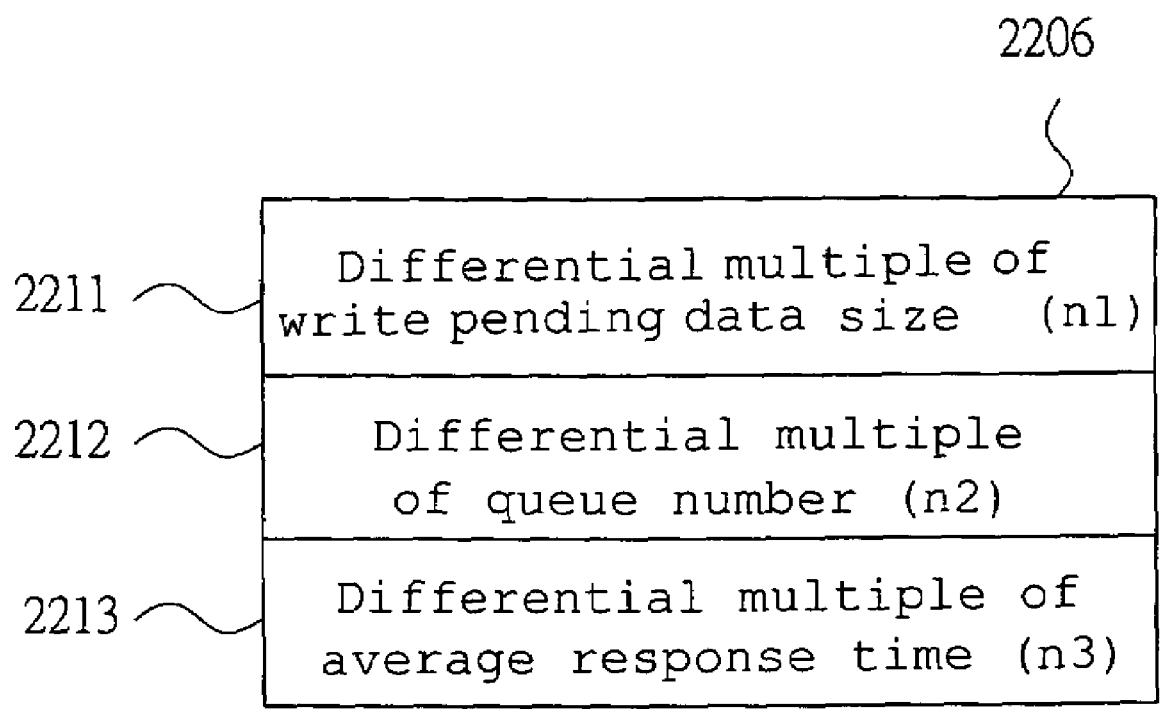
FIG. 14 is a view showing parameters, which are saved in a shared memory, for detecting degradation in the performance of a disk drive in the disk array apparatus according to the one embodiment of the present invention.
Figure 15:
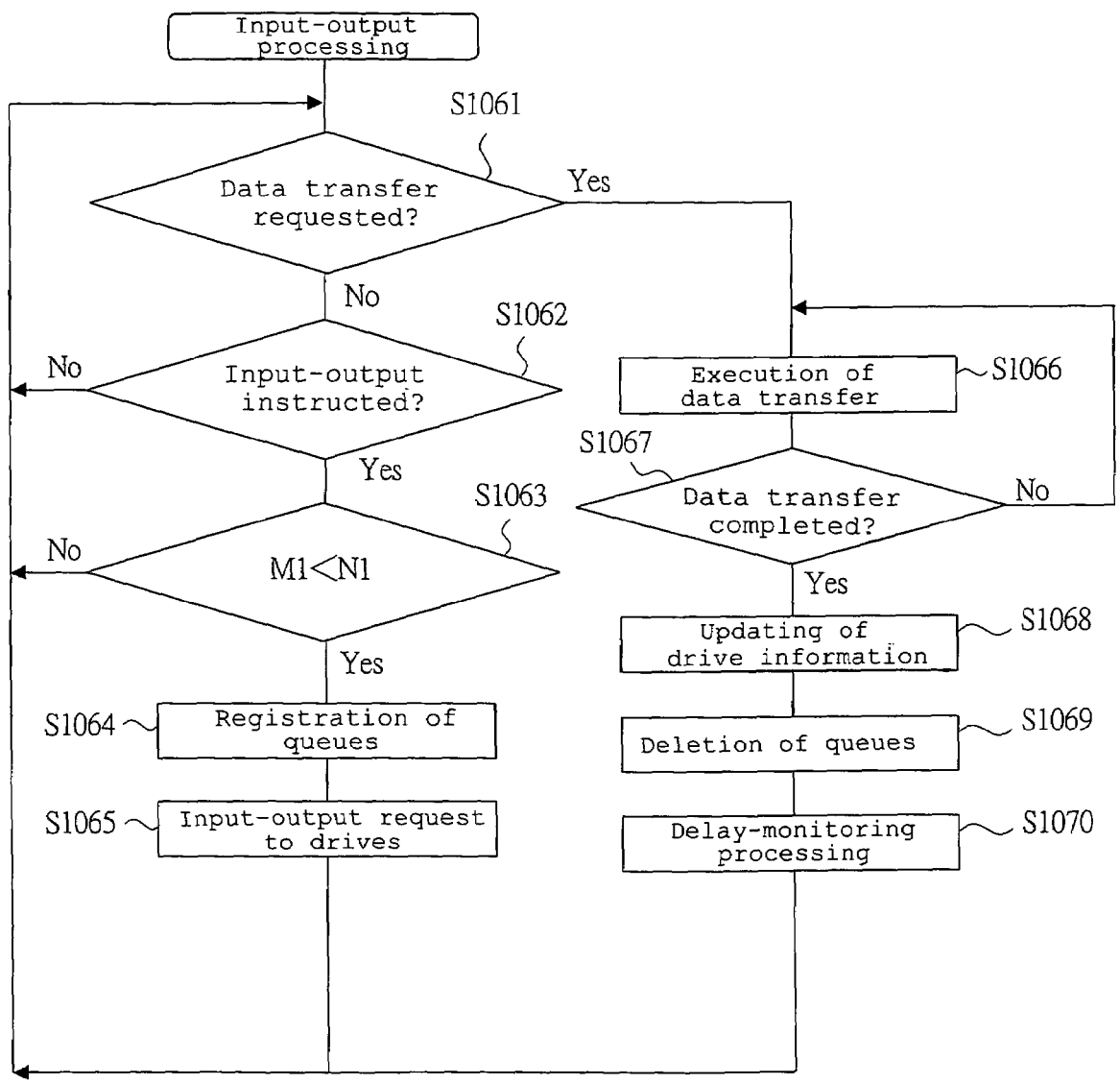
FIG. 15 is a flow diagram showing operations for an input-output sequence between the disk controllers and the disk drives in the disk array apparatus according to the one embodiment of the present invention.
Figure 16A:
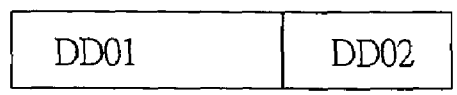
FIG. 16A is a view showing a specific relation between a piece of write pending data and a data transfer length which has been increased or decreased, in the disk array apparatus according to the one embodiment of the present invention.
Figure 16B:
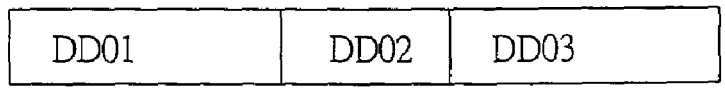
FIG. 16B is a view showing a specific relation between a piece of write pending data and a data transfer length which has been increased or decreased, in the disk array apparatus according to the one embodiment of the present invention.
Figure 16C:
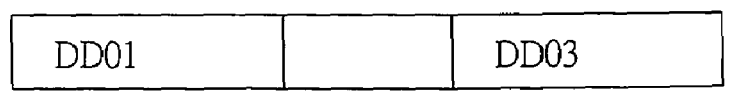
FIG. 16C is a view showing a specific relation between a piece of write pending data and a data transfer length which has been increased or decreased, in the disk array apparatus according to the one embodiment of the present invention.

One example of detection of degradation in the performance of a disk drive in the disk array apparatus according to the one embodiment of the present invention will be explained, referring to FIGS. 14 through 16. FIG. 14 is a view showing parameters, which are saved in the shared memory, for detecting degradation in the performance of a disk drive; FIG. 15 is a flow diagram showing operations for an input-output sequence between the disk controllers and the disk drives; and FIGS. 16A through 16C are views showing a specific relation between a piece of write pending data and a data transfer length which has been increased or decreased.

As shown in FIG. 14, the parameters 2206, which are stored in the shared memory 220, for detecting degradation in the performance of a disk drive are a differential multiple (n1) 2211 of the write pending data size, a differential multiple (n2) 2212 of the queue number, a differential multiple (n3) 2213 of the average response time, and the like.

As shown in FIG. 15, in operations for an input-output sequence between a related one of the disk controllers 240 and a related one of the disk drives 311 through 315, the related disk controller 240 judges at a step S1061 whether a piece of data is requested by a related one of the disk drives 311 through 315 to be transferred. When there is no data-transfer request (No), it is checked at a step S1062 whether the channel controllers 210 have made an input-output instruction to a related one of the disk drives 311 through 315. When there is no input-output instruction (No), the processing returns to the step S1061.

When there is an input-output instruction at the step S1062 (Yes), it is checked at a step S1063 whether a registered queue number M1 corresponding to the disk drives 311 through 315 which issue an input-output command is less than a queue number N1 which can be registered. When not under the number N1 (No), the processing returns to the step S1061, and, when less than the number N1 (Yes), the queue number M1 is incremented (registered) at a step S1064. Then, the command type 2422, the input-output starting position 2423, the data transfer length 2424, the current time, that is, the request-starting time 2425 are registered in the queues 2411 through 2415 in the P1-th queue in which the use information 2426 is not used, wherein P1 is between 1 and N1, and, subsequently, the use information 2426 of the P1-th queue is assumed to be under use. The pieces of information on the queue number P1, the command type 2422, the input-output starting position 2423, and the data transfer length 2424 are sent to the corresponding disk drives 311 through 315 at a step S1065, based on the registered queue information, and input-output processing is requested.

When there is a data-transfer request at the step S1061 (Yes), data transfer is executed at a step S1066 according to the contents of the queues 2411 through 2415 for the queue number P1 corresponding to the information which is requested to be transferred. For example, in the case of read transfer, a related piece of data in the disk drives 311 through 315 are transferred to a related one among pieces of write pending data 2301 through 2305 at a corresponding position in the cache memory 230, and, in the case of write transfer, a related piece of data is transferred from a related one among pieces of write pending data 2301 through 2305 at a corresponding position in the cache memory 230 to a related one of the disk drives 311 through 315.

Then, it is confirmed at a step S1067 whether the data transfer is completed or not. When not completed (No), the processing returns to the step S1066, and, when completed (Yes), the drive information is updated at a subsequent step S1068. That is, the response time (=[current time]−[requested time registered in a queue with a queue number of P1]) is registered in the response time 233X indicated by the response-time pointer (X) 2322, and the response time pointer is incremented (when the response time pointer X is larger than m, the response time pointer X is returned to 0) to calculate the average response time 2323, using the response time 2331 through 233m. Moreover, when the completed data transfer has been write transfer, the data transfer length 2424 after completion of transferring from the write pending data size 2321 is divided. Subsequently, the use information 2426 of the queue with the queue number of P1 after completion of transferring is set in an unused state (deleted), and the registered queue number M1 is decremented at a step S1069. Then, monitoring processing of delayed responses from the disk drives is executed at a step S1070, and the processing returns to S1061.

Specifically, a relation between a piece of write pending data and a data transfer length which has been increased or decreased will be explained, taking the disk drive (D1) 311 as one example. When it is assumed that pieces of write pending data DD01 and DD02 exist in the disk drive (D1) 311 of the cache memory 230, the write pending data size 2321 as the drive information (D1) 2201 in the shared memory 220 becomes the sum of the size of DD01 and that of DD02, as shown in FIG. 16A. Then, when a piece of write pending data DD03 is added to the cache memory 230 according to a new write request, the write pending data size 2321 becomes the sum of the size of DD01, that of DD02, and that of DD03 as shown in FIG. 16B. And, when writing of the new write pending data DD02 into the disk drive is completed, and the write pending data DD02 is cleared from the cache memory 230, the write pending data size 2321 becomes the sum of the size of DD01 and that of DD03 as shown in FIG. 16C.

Though the above explanation has been made referring to the disk drive (D1) 311, the same explanation can be applied to the disk drives (D2) 312, (D3) 313, (P) 314, (S) 315. That is, when the degradation in the performance of the disk drives is caused, and the completion of writing into the disk drives is delayed, clearing of the write pending data is also delayed to cause increase in the write pending data size.

<Example of Monitoring Processing of Delay in Response of Disk Drive>

Figure 17:
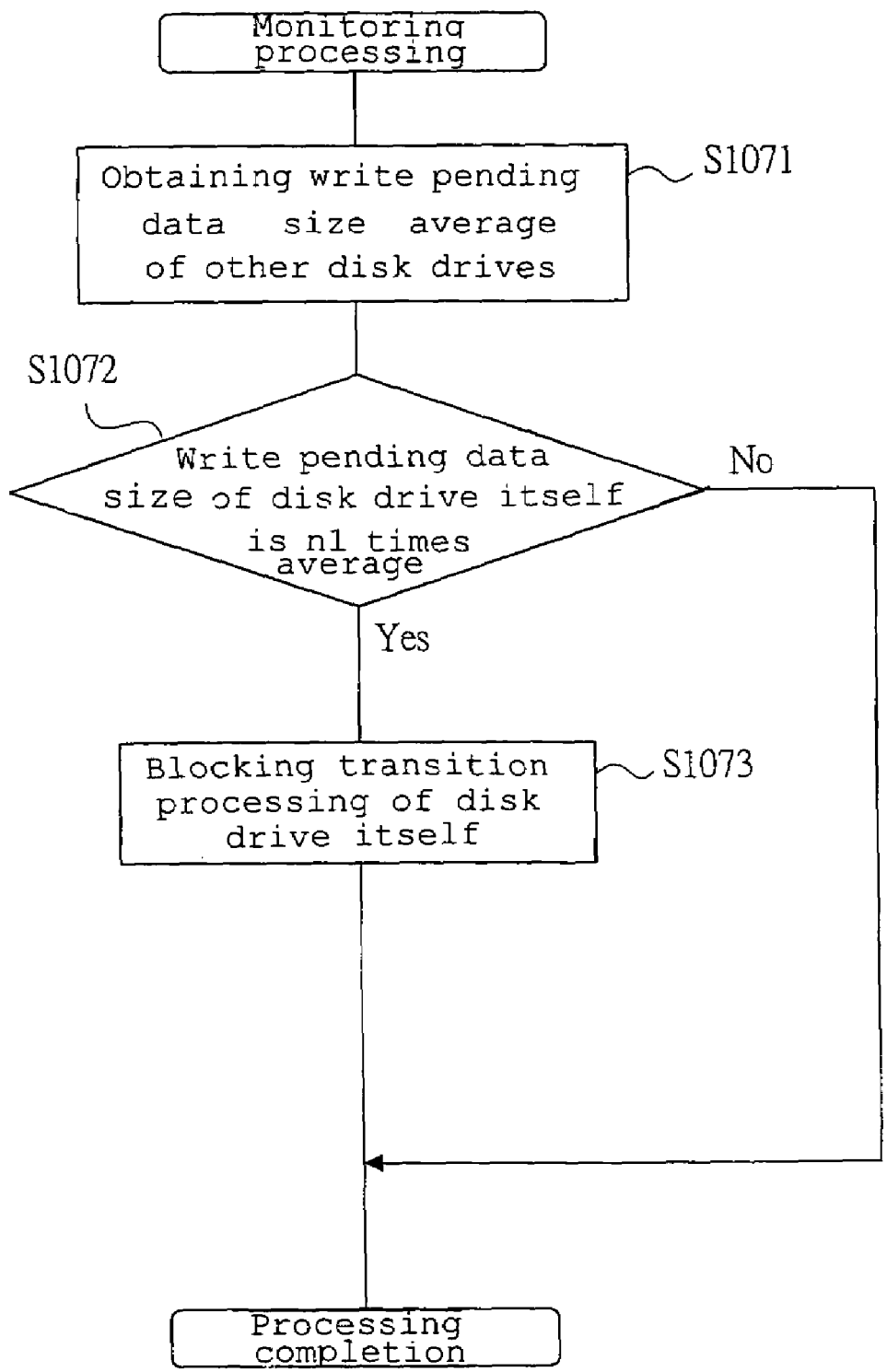
FIG. 17 is a flow diagram showing monitoring processing of delay in response, focusing attention on the write pending data size, in the disk array apparatus according to the one embodiment of the present invention.
Figure 18:
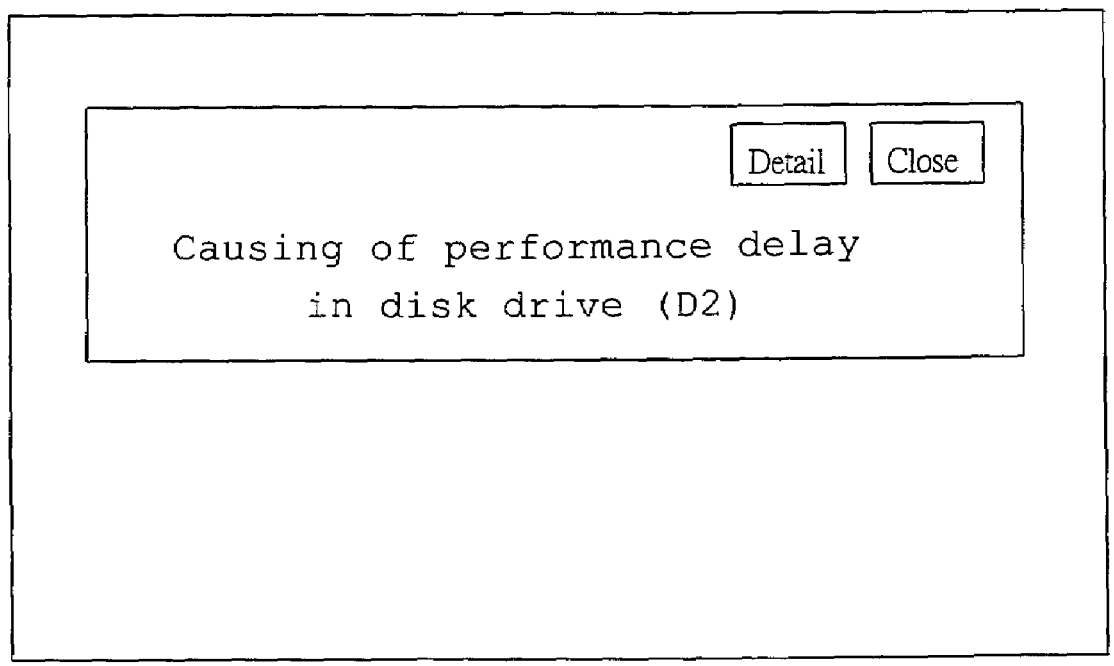
FIG. 18 is a view showing a display screen of a warning message in the disk array apparatus according to the one embodiment of the present invention.
Figure 19:
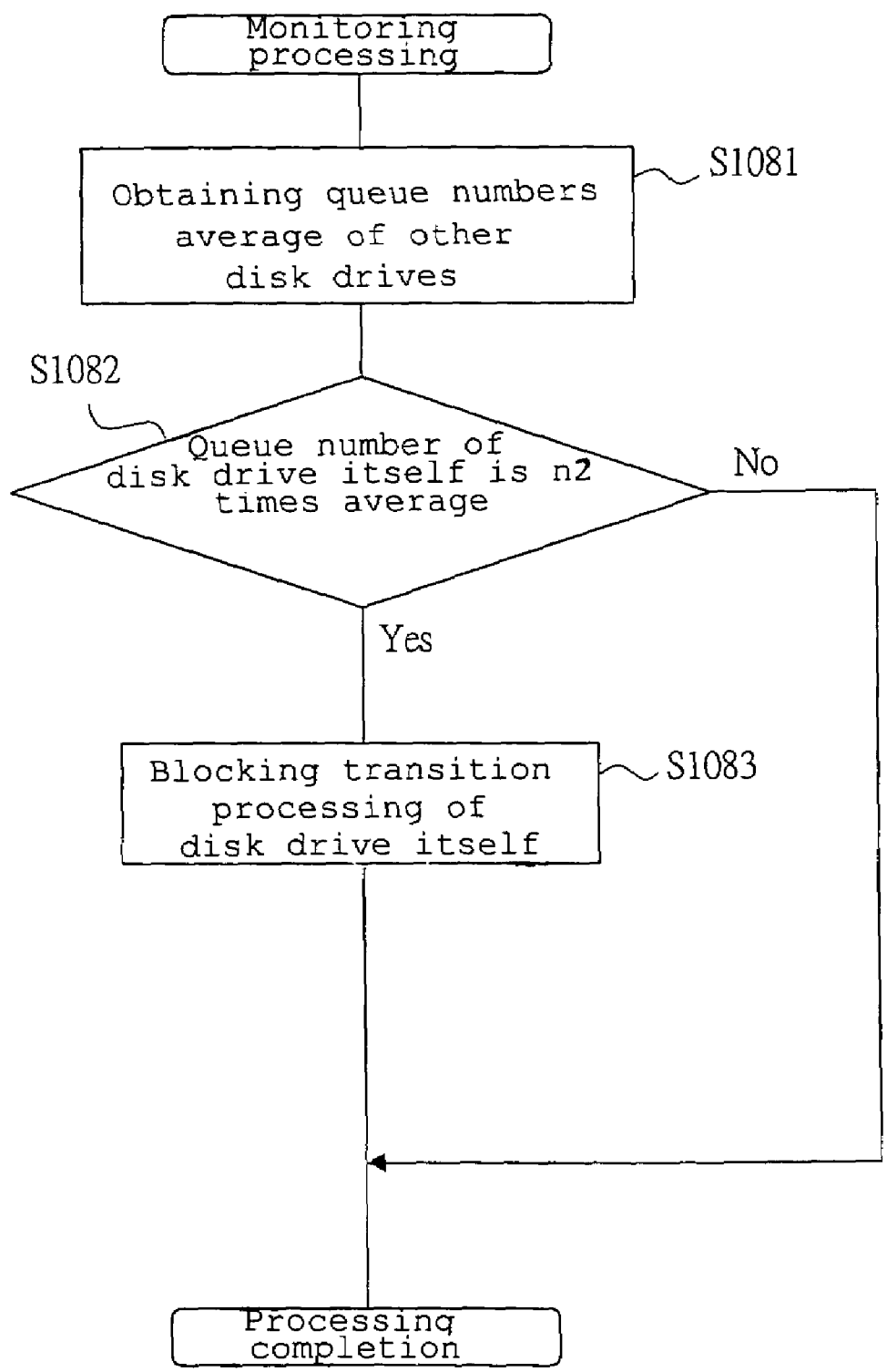
FIG. 19 is a flow diagram showing monitoring processing of delay in response, focusing attention on the queue number, in the disk array apparatus according to the one embodiment of the present invention.
Figure 20:
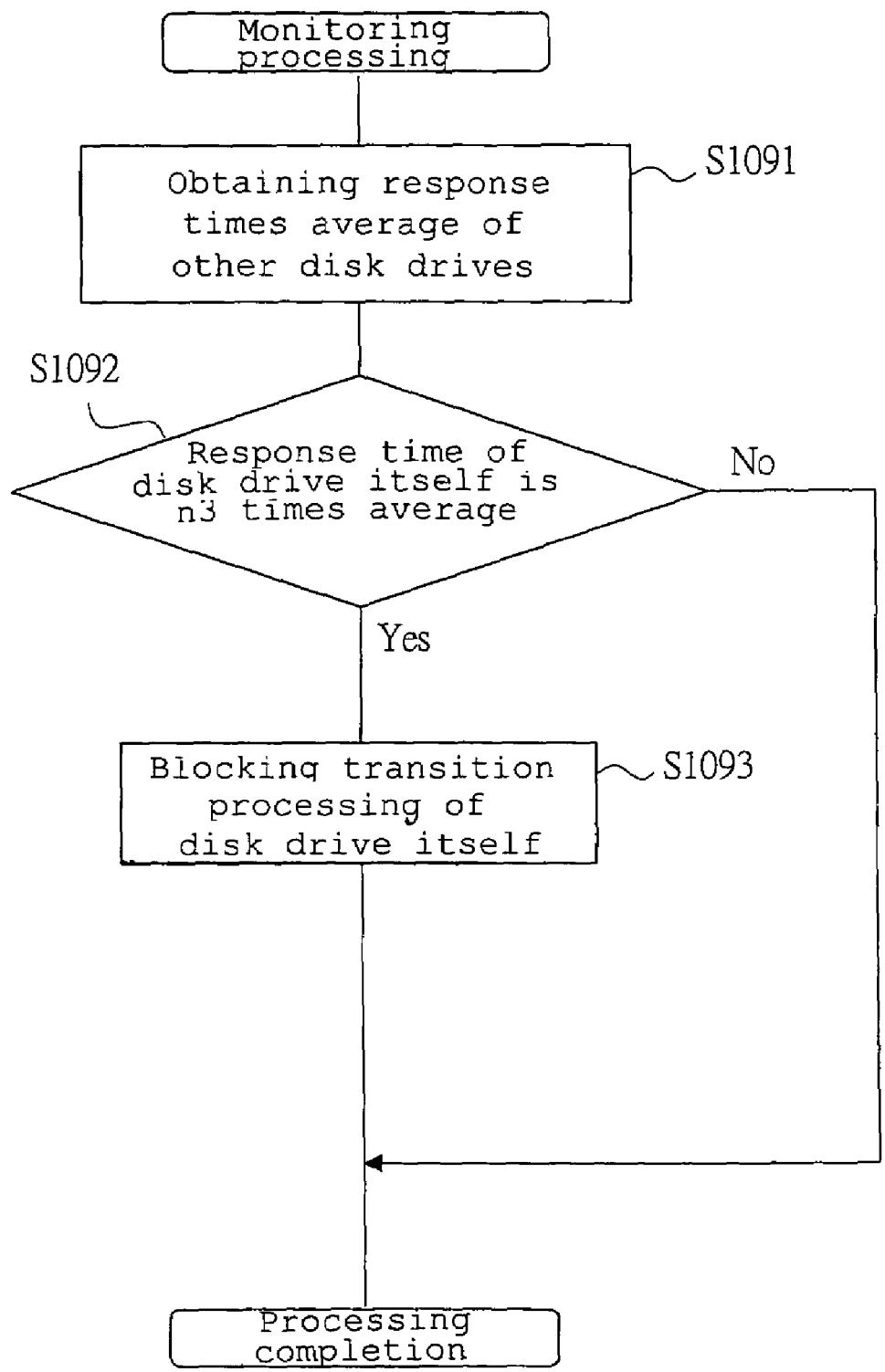
FIG. 20 is a flow diagram showing monitoring processing of delay in response, focusing attention on the average response time, in the disk array apparatus according to the one embodiment of the present invention.

One example of monitoring processing of delay in response of a disk drive in the disk array apparatus according to the one embodiment of the present invention will be explained, referring to FIGS. 17 through 20. FIG. 17 is a flow diagram showing monitoring processing of delay in response, focusing attention on the write pending data size; FIG. 18 is a view showing a display screen of a warning message; FIG. 19 is a flow diagram showing monitoring processing of delay in response, focusing attention on the queue number; and FIG. 20 is a flow diagram showing monitoring processing of delay in response, focusing attention on the average response time.

The disk subsystem of the present embodiment has a configuration with the redundancy using RAID logic. For example, the above-described drawing FIG. 4 shows a configuration of three data drives plus one parity drive (hereinafter, described as 3D+1P). In this configuration, a piece of write data with a larger size than a predetermined one in the host computer 400 is usually divided into three pieces data with an equal size. The three divided data are written into the disk drives (D1) 311 through (D3) 313, and pieces of redundancy data calculated based on the divided data are written into the disk drive (P1) 314. Therefore, a data amount to be written into the disk drives 311 through 314 according to one write request from the host computer 400 is uniform, and the write pending data size obtained by addition also becomes uniform when each disk drive has similar performance. In the case where there is a disk drive with a poor performance, the write pending data size, which is obtained by addition, for the defective disk drive becomes larger than that of the other disk drives.

Accordingly, considering the write pending data size, monitoring processing of delay in response, focusing attention on the write pending data size, will be explained, referring to FIG. 17. FIG. 17 explains as one example the processing of delay in disk drive after completion of data transfer of the disk drive (D2) 312 which has a configuration of (3D+1P) as shown in the above-described drawing FIG. 4.

An average Q1 of the write pending data sizes of pieces of the drive information 2201, 2203, 2204, corresponding to the other disk drives 311, 313, and 314 in the shared memory 220 is obtained at a step S1071. Then, when the write pending data size 2321 for the disk drive (D2) 312 is compared with Q1 (Q1×the write pending data size differential multiple (n1) at a step S1072, and "the write pending data size is larger than Q1×n1" is true (Yes), it is judged at a step S1072 that the disk drive is one with a disturbance of delay, and blocking transition processing is executed at a step S1073. When false (No), it is judged that the disk drive is a normal one, and the processing is completed.

Moreover, for example, when "the write pending data size is larger than half of Q1×n1" is true at the above-described comparison, it is judged the disk drive has a possibility that there is caused a disturbance of delay, and the possibility is notified to the service processor 250 through the service processor interface 251. Subsequently, for example, a warning message saying "caused a performance delay in the disk drive (D2)" may be output on a screen shown in FIG. 18 in the service processor 250.

Moreover, in the disk subsystem of the present embodiment, a piece of write data with a larger size than a predetermined one in the host computer 400 is usually divided into pieces of data with an equal size, as described above. It is self-evident that the pieces of equally divided data which have been stored are equally read from a related one of the disk drives 311 through 314, meeting a read request from the host computer 400. That is, a number of read-write requests (queue number) to each of the disk drives 311 through 314, and each data transfer length becomes approximately uniform. If there is a disk drive with a poor performance, the number of input-output requests (queue numbers) to the disk drive becomes larger than that of the other disk drives.

Accordingly, considering the queue number, monitoring processing of delay in response, focusing attention on the queue number, will be explained, referring to FIG. 19. FIG. 19 explains as one example the processing of delay in disk drive after completion of data transfer of the disk drive (D3) 313 which has a configuration of (3D+1P) as shown in the above-described drawing FIG. 4.

An average Q2 of the registered numbers of queues 2411, 2412, 2414 for the other disk drives 311, 312, 314 is obtained at a step S1081. Then, when the registered number of the queue 2413 for the disk drive (D3) 313 is compared with Q2 (Q2×the queue-number differential multiple (n2) at a step S1082, and "the registered number of the queue is larger than Q2×n2" is true (Yes), it is judged that the disk drive is one with a disturbance of delay, and blocking transition processing is executed at a step S1083. When false (No), it is judged that the disk drive is a normal one, and the processing is completed.

Moreover, when "the registered number of the queue is larger than half of Q2×n2" is true at the above-described comparison, it is judged the disk drive has a possibility that there is caused a disturbance of delay, and the possibility is notified to the service processor 250, in a similar manner to the above case in which the write pending data size is noticed. Subsequently, a warning message saying, for example, "caused a performance delay in the disk drive (D3)" may be output on the screen shown in FIG. 18 in the service processor 250.

Furthermore, a number of input-output requests and a data transfer length to each of the disk drives become uniform in the disk subsystem according to the present embodiment, as described above. That is, it is self-evident that, when the disk drives 311 through 314 have a similar performance, the time (response time) required for data transfer is uniform. If there is a disk drive with a poor performance, the average response time for the disk drive becomes longer than that of the other disk drives.

Accordingly, considering the average response time, monitoring processing of delay in response, focusing attention on the average response time, will be explained, referring to FIG. 20. FIG. 20 explains as one example the processing of delay in disk drive after completion of data transfer of the disk drive (D1) 311 which has a configuration of (3D+1P) as shown in the above-described drawing FIG. 4.

An average Q3 of the average response time 2323 for the pieces of drive information 2202, 2203, 2204 in the shared memory 220 for the other disk drives 312, 313, 314 is obtained at a step S1091. Subsequently, when the average response time 2323 for the disk drive (D1) 311 is compared with Q3 (Q3×the average-response-time differential multiple (n3) 2213 at a step S1092 and "the average response time is larger than Q3×n3" is true (Yes), it is judged that the disk drive is one with a disturbance of delay, and blocking transition processing is executed at a step S1093. When false (No), it is judged that the disk drive is a normal one, and the processing is completed.

Moreover, when "the average response time is larger than half of Q3×n3" is true at the above-described comparison, it is judged the disk drive has a possibility that there is caused a disturbance of delay, and the possibility is notified to the service processor 250, in a similar manner to the above case in which the write pending data size is noticed. Subsequently, a warning message saying, for example, "caused a performance delay in the disk drive (D1)" may be output on the screen shown in FIG. 18 in the service processor 250.

<Example of Blocking Transition Processing of Disk Drive>

Figure 21:
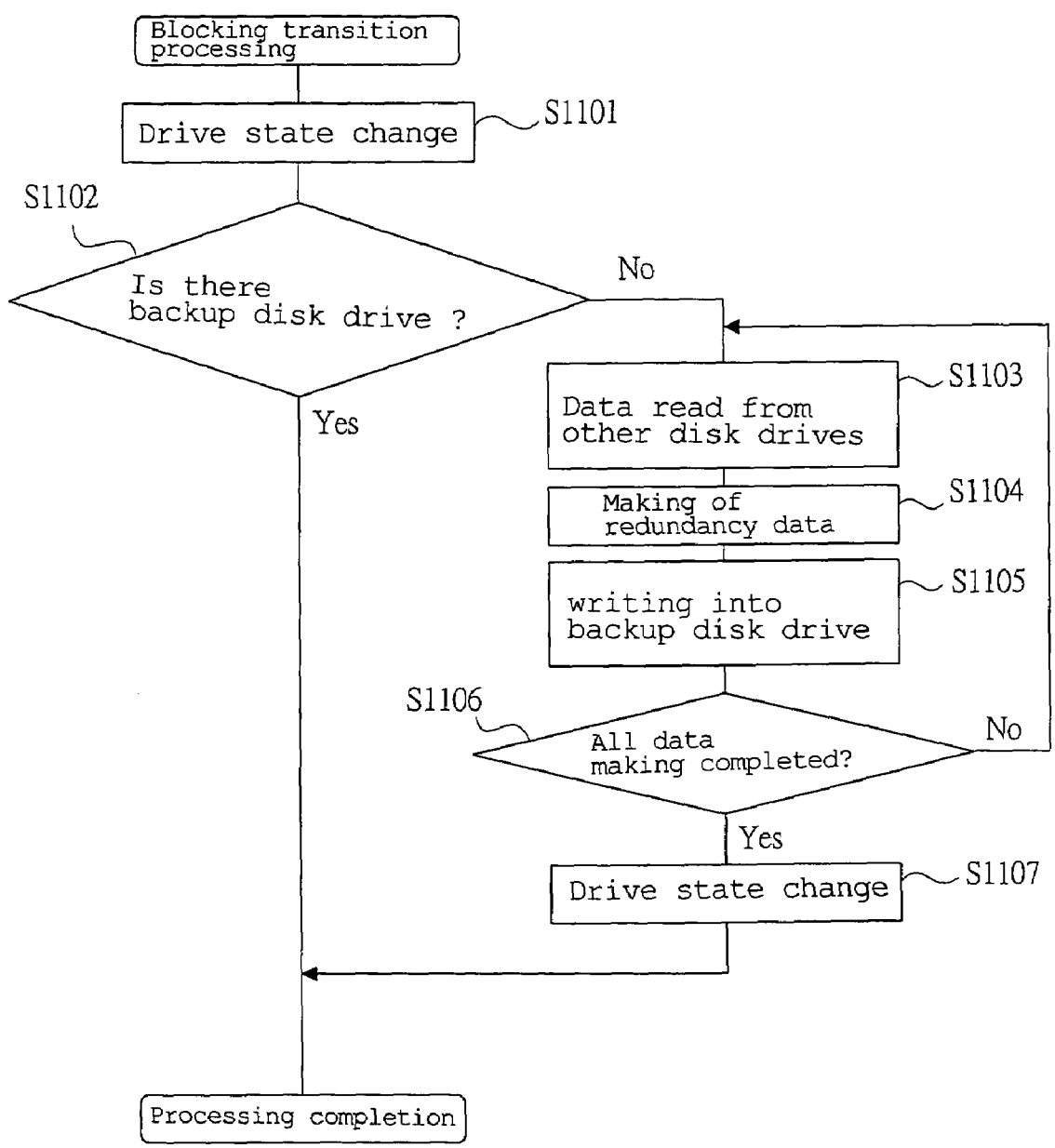
FIG. 21 is a flow diagram showing blocking transition processing of a disk drive in the disk array apparatus according to the one embodiment of the present invention.

One example of blocking transition processing of a disk drive in the disk array apparatus according to the one embodiment of the present invention will be explained, referring to FIG. 21. FIG. 21 is a flow diagram showing the blocking transition processing of the disk drive. In FIG. 21, the blocking transition processing will be explained, taking the processing in the disk drive (D2) 312.

It is assumed at a step S1101 that the use information 2426 forming the queue 2412 corresponding to the disk drive (D2) 312 to be an object for the blocking transition processing is in a drive state showing that the information can not be used (change). And when there is an input-output request to the related disk drive 312, the processing is performed as described above. Thereby, the disk drive with the poor performance is eliminated from the disk subsystem. Accordingly, the degradation degree in the performance for the disk drive is reduced to prevent the degradation in the performance as the disk subsystem.

Then, it is judged at a step S1102 whether the backup disk drive (S) 315 exists or not, and when there is no backup disk drive (No), the processing is completed. When it is judged at the step S1102 that the backup disk drive exists in the system (Yes), pieces of data are read from the other disk drives 311, 313, and 314 at a step S1103, and are stored in areas for pieces of data 2301, 2303, and 2304 in the cache memory 230. Subsequently, the piece of data 2305 for the disk drive (D2) is regenerated at a step S1104, using the redundancy of the above pieces of data. The data 2305 which has been regenerated at a subsequent step S1105 is written into the disk drive 315 as a backup disk drive.

Then, it is judged at a step S1106 whether all data have been made or not, and, when there is a piece of data to be made (No), the processing returns to the step S1103. When it is judged at the step S1106 that all data has been made (Yes), the drive state of the use information 2426 for the backup disk drive (S) 315 is changed from "backup" to "the disk drive can be used as a disk drive (D2)" at a step S1107, and the processing is completed.

<Example of Changing Processing of Parameters for Detection of Degradation in Performance of Disk Drive>

One example of changing processing of parameters for detection of degradation in the performance of a disk drive in the disk array apparatus according to the one embodiment of the present invention will be explained, referring to FIGS. 22 through 25. FIG. 22 is a view showing a setting screen for changing the detection level of the performance delay; FIG. 23 is a view showing correspondences between the detection levels and differential coefficients; FIG. 24 is a view showing a setting screen for changing response times and the I/O transaction performance; and FIG. 25 is a view showing correspondences among the detection levels, the actual queue numbers, and the retrying times.

In the disk subsystem according to the present embodiment, coefficients such as a differential multiple (n1) 2211 of a write pending data size, a differential multiple (n2) 2212 of a queue number, a differential multiple (n3) of 2213 of an average response time can be changed in the service processor 250 connected through the service processor interface 251, wherein the coefficients are parameters 2206 which are stored in the shared memory 220, for detecting degradation in the performance for a disk drive.

For example, on a set screen of the service processor 250 as shown in FIG. 22, a user can select a level for detecting degradation in the performance for a disk drive from three levels of A (Easy), B (Normal), and C (Hard) and a Custom level in which numerical values can be directly input, that is, from four levels in total. Each value of coefficients as the differential multiples (n1), (n2), and (n3) for each detection level are set as shown in, for example, FIG. 23.

Thereby, the user usually selects the detection level B at which the coefficients are set as an intermediate value (1.5). When the user would like to detect a disk drive with degradation in the performance at the earliest possible time, the detection level A at which the coefficients are set as a small value (1.2) is selected, and when the user would like to have a mode in which a disk drive even with some degradation in the performance is not blocked and to reduce the running cost, the detection level C at which the coefficients are set as a large value (2.0) is selected. For more precise setting, the custom level at which the coefficients can be set as an arbitrary value is selected to realize desired adjustment meeting individual requirements.

Moreover, in the disk subsystem according to the present embodiment, the number M1 (maximum value) of the queues 2411 through 2415 which are stored in the local memories 241 of the disk controllers 240 can be changed, using the service processor 250. Moreover, the retrying times of the disk drives 311 through 315 can be also changed, using the service processor 250.

For example, on the set screen of the service processor 250 as shown in FIG. 24, a user can select a level from three levels of A (Response Time: Fast, Input-Output Processing Number: MIN), B (Response Time: Normal, Input-Output Processing Number: Normal), and C (Response Time: Slow, Input-Output Processing Number: MAX) and a Custom level in which numerical values can be directly input, that is, from four levels in total. The numbers M1 of queues and the numbers of retry operations for each level are set, for example, as values shown in FIG. 25. When the number of queues is increased, the multiple performance is improved, and the better transaction performance can be obtained when there is no disturbances such as performance delay. But, when there is disturbances such as performance delay, more improved multiple performance causes the more possibility that command sinking is caused.

Considering the above circumstances, a user usually selects the level B with an intermediate values (M1: 1 and the retrying times: 10). When the response time to one command is important, and degradation or disturbances in the performance is required to be found as soon as possible, the level A with small values (M1: 1, the retrying times: 5) is selected. When the multiple performance is much more required with no disturbances, the level C with large values (M1: 8, the retrying times: 20) is selected. Desired adjustment meeting individual requirements can be realized by selecting the level Custom at which arbitrary values can be set.

Therefore, the following advantages can be obtained according to the disk array apparatus (disk subsystem) of the present embodiment.

(1) A disk drive with degradation in the performance can be specified by holding write pending data sizes, which are input from the host computer 400 and are required to be written into the disk drives in the cache memory 230, in the shared memory 220, and by relatively comparing the write pending data sizes among the other disk drives with redundancy.

(2) A disk drive with degradation in the performance can be specified by holding average response times for individual disk drives in the shared memory 220 to relatively compare the average response times among the other disk drives with redundancy.

(3) A disk drive with degradation in the performance can be specified by holding queue numbers for individual disk drives in the disk controllers 240 to relatively compare the queue numbers among the other disk drives with redundancy.

(4) A disk drive with degradation in the performance is specified and blocked, and, subsequently, pieces of data can be restored in a backup disk drive, using pieces of data in other disk drives with redundancy.

(5) Desired adjustment meeting individual requirements can be realized, because various kinds of coefficients of retrying times, a differential multiple (n1) of a write pending data size, a differential multiple (n2) of a queue number, and a differential multiple (n3) of an average response time can be changed, and a user can select one of detection levels.

(6) According to the above-described advantages (1) through (5), a disk drive with degradation in the performance can be detected even if the disk drive itself does not comprise a function to detect degradation in the performance, and a system which meets requirements of a user can be realized by changing a detection level of the gradation in the performance.

As described above, the invention made by the inventors have been explained in detail, based on embodiments, but the present invention is not limited to the above-described embodiments. Obviously, various kinds of modifications and changes may be possible without departing from the scope of the present invention.

What is claimed is:

1. A disk array apparatus comprising:

a plurality of storage devices by which writing or reading data is executed in such a way that, when there is caused an error in writing or reading data into or from a storage area, writing or reading data is repeated again until completed and thereafter notifying that writing or reading data has been normally completed;

storage device control sections which include storing areas saving requests for write or read operations of data into or from said plurality of storage devices, control write or read operation of data into or from said plurality of storage devices, and receive notification that the write or read operation of data into or from said plurality of storage devices is normally completed;

channel control sections which receive a request for write or read operation from a network outside the disk array apparatus itself;

a shared memory in which pieces of control information communicated by said channel control sections and said storage device control sections are stored;

a cache memory in which pieces of data for communication between said channel control sections and said storage device control sections are temporarily saved; and a connecting sections connected to said channel control sections, said storage device control sections, said shared memory, and said cache memory, wherein said storage device control sections generate logical storage areas using said storage areas in said plurality of storage devices, said logical storage areas being used for writing or reading data and having redundancy to store data, wherein said storage device control sections monitor said storing areas in which a request for writing or reading data into or from the plurality of storage devices forming the logical storage areas is stored, wherein among said plurality of storage devices forming said logical storage areas, said storage device control sections specify a storage device, for which the number of repeated times for reading or writing data is large, and block said specified storage device, wherein said plurality of storage devices have redundancy, wherein said shared memory has areas which hold average response times for each of the plurality of storage devices, and wherein said storage device control sections compare said average response times among said plurality of storage devices with the redundancy when the storage device with a larger number of repeated times for writing or reading data is specified, and specify the storage device with larger average response time as one to be blocked.

2. A disk array apparatus comprising:

a plurality of storage devices by which writing or reading data is executed in such a way that, when there is caused an error in writing or reading data into or from a storage area, writing or reading data is repeated again until completed and thereafter notifying that writing or reading data has been normally completed;

storage device control sections which include storing areas saving requests for write or read operations of data into or from said plurality of storage devices, control write or read operation of data into or from said plurality of storage devices, and receive notification that the write or read operation of data into or from said plurality of storage devices is normally completed;

channel control sections which receive a request for write or read operation from a network outside the disk array apparatus itself;

a shared memory in which pieces of control information communicated by said channel control sections and said storage device control sections are stored;

a cache memory in which pieces of data for communication between said channel control sections and said storage device control sections are temporarily saved; and a connecting sections connected to said channel control sections, said storage device control sections, said shared memory, and said cache memory, wherein said storage device control sections generate logical storage areas using said storage areas in said plurality of storage devices, said logical storage areas being used for writing or reading data and having redundancy to store data, wherein said storage device control sections monitor said storing areas in which a request for writing or reading data into or from the plurality of storage devices forming the logical storage areas is stored, wherein among said plurality of storage devices forming said logical storage areas, said storage device control sections specify a storage device, for which a number of repeated times is large, and block said specified storage device, wherein said plurality of storage devices have redundancy, and wherein said storage device control sections have areas which hold queue numbers for each of the plurality of storage devices, compare said queue numbers among said plurality of storage devices with the redundancy when the storage device with a larger number of repeated times for writing or reading data is specified, and specify the storage device with larger average response time as one to be blocked.

3. A disk array apparatus comprising:

a plurality of storage devices by which writing or reading data is executed in such a way that, when there is caused an error in writing or reading data into or from a storage area, writing or reading data is repeated again until completed and thereafter notifying that writing or reading data has been normally completed;

storage device control sections which include storing areas saving requests for write or read operations of data into or from said plurality of storage devices, control write or read operation of data into or from said plurality of storage devices, and receive notification that the write or read operation of data into or from said plurality of storage devices is normally completed;

channel control sections which receive a request for write or read operation from a network outside the disk array apparatus itself;

a shared memory in which pieces of control information communicated by said channel control sections and said storage device control sections are stored;

a cache memory in which pieces of data for communication between said channel control sections and said storage device control sections are temporarily saved; and a connecting sections connected to said channel control sections, said storage device control sections, said shared memory, and said cache memory, wherein said storage device control sections generate logical storage areas using said storage areas in said plurality of storage devices, said logical storage areas being used for writing or reading data and having redundancy to store data, wherein said storage device control sections monitor said storing areas in which a request for writing or reading data into or from the plurality of storage devices forming the logical storage areas is stored, wherein among said plurality of storage devices forming said logical storage areas, said storage device control sections specify a storage device, for which a number of repeated times is large, and block said specified storage device, wherein said plurality of storage devices have redundancy, wherein said disk array apparatus further comprises:

a management terminal connected to the connection section, wherein said management terminal sets conditions for specifying, among said storage devices with the redundancy, the storage device with a larger number of repeated times for writing or reading data, wherein one of the conditions is a differential multiple of an amount of a piece of write pending data in the cache memory to be written into said storage devices.

4. A disk array apparatus comprising:

a plurality of storage devices by which writing or reading data is executed in such a way that, when there is caused an error in writing or reading data into or from a storage area, writing or reading data is repeated again until completed and thereafter notifying that writing or reading data has been normally completed;

storage device control sections which include storing areas saving requests for write or read operations of data into or from said plurality of storage devices, control write or read operation of data into or from said plurality of storage devices, and receive notification that the write or read operation of data into or from said plurality of storage devices is normally completed;

channel control sections which receive a request for write or read operation from a network outside the disk array apparatus itself;

a shared memory in which pieces of control information communicated by said channel control sections and said storage device control sections are stored;

a cache memory in which pieces of data for communication between said channel control sections and said storage device control sections are temporarily saved; and a connecting sections connected to said channel control sections, said storage device control sections, said shared memory, and said cache memory, wherein said storage device control sections generate logical storage areas using said storage areas in said plurality of storage devices, said logical storage areas being used for writing or reading data and having redundancy to store data, wherein said storage device control sections monitor said storing areas in which a request for writing or reading data into or from the plurality of storage devices forming the logical storage areas is stored, wherein among said plurality of storage devices forming said logical storage areas, said storage device control sections specify a storage device, for which a number of repeated times is large, and block said specified storage device, wherein said plurality of storage devices have redundancy, wherein said disk array apparatus further comprises:

a management terminal connected to the connection section, wherein said management terminal sets conditions for specifying, among said storage devices with the redundancy, the storage device with a larger number of repeated times for writing or reading data, wherein one of the conditions is a differential multiple of an average response time for each of said plurality of storage devices.

5. A disk array apparatus comprising:

a plurality of storage devices by which writing or reading data is executed in such a way that, when there is caused an error in writing or reading data into or from a storage area, writing or reading data is repeated again until completed and thereafter notifying that writing or reading data has been normally completed;

storage device control sections which include storing areas saving requests for write or read operations of data into or from said plurality of storage devices, control write or read operation of data into or from said plurality of storage devices, and receive notification that the write or read operation of data into or from said plurality of storage devices is normally completed;

channel control sections which receive a request for write or read operation from a network outside the disk array apparatus itself;

a shared memory in which pieces of control information communicated by said channel control sections and said storage device control sections are stored;

a cache memory in which pieces of data for communication between said channel control sections and said storage device control sections are temporarily saved; and a connecting sections connected to said channel control sections, said storage device control sections, said shared memory, and said cache memory, wherein said storage device control sections generate logical storage areas using said storage areas in said plurality of storage devices, said logical storage areas being used for writing or reading data and having redundancy to store data, wherein said storage device control sections monitor said storing areas in which a request for writing or reading data into or from the plurality of storage devices forming the logical storage areas is stored, wherein among said plurality of storage devices forming said logical storage areas, said storage device control sections specify a storage device, for which a number of repeated times is large, and block said specified storage device, wherein said plurality of storage devices have redundancy, wherein said disk array apparatus further comprises:

a management terminal connected to the connection section, wherein said management terminal sets conditions for specifying, among said storage devices with the redundancy, the storage device with a larger number of repeated times for writing or reading data, wherein one of the conditions is a differential multiple of a queue number for each of said plurality of storage devices.

6. A method for controlling a disk array apparatus, said apparatus comprising:

a plurality of storage devices by which writing or reading data is executed in such a way that, when there is caused an error in writing or reading data into or from a storage area, writing or reading data is repeated again until completed and thereafter notifying that writing or reading data has been normally completed;

storage device control sections which include storing areas storing requests for write or read operations of data into or from said plurality of storage devices, control write or read operation of data into or from said plurality of storage devices, and receive notification that the write or read operation of data into or from said plurality of storage devices is normally completed;

channel control sections which receive a request for write or read operation from a network outside the disk array apparatus itself;

a shared memory in which pieces of control information communicated by said channel control sections and said storage device control sections are stored;

a cache memory in which pieces of data for communication between said channel control sections and said storage device control sections are temporarily stored; and a connecting sections connected to said channel control sections, said storage device control sections, said shared memory, and said cache memory, wherein said storage device control sections generate logical storage areas using said storage areas in said plurality of storage devices, said logical storage areas being used for writing or reading data and having redundancy to store data, wherein said storage device control sections monitor said storing areas in which a request for writing or reading data into or from the plurality of storage devices forming the logical storage areas is stored, wherein among the plurality of storage devices forming the logical storage areas, said storage device control sections specify a storage device, for which a number of repeated times is large, and block said specified storage device, wherein said plurality of storage devices have redundancy, wherein said shared memory has areas which hold average response times for each of the plurality of storage devices, and wherein said storage device control sections compare said average response times among said plurality of storage devices with the redundancy when the storage device with a larger number of repeated times for writing or reading data is specified, and specify the storage device with larger average response time as one to be blocked.

7. A method for controlling a disk array apparatus, said apparatus comprising:

a plurality of storage devices by which writing or reading data is executed in such a way that, when there is caused an error in writing or reading data into or from a storage area, writing or reading data is repeated again until completed and thereafter notifying that writing or reading data has been normally completed;

storage device control sections which include storing areas storing requests for write or read operations of data into or from said plurality of storage devices, control write or read operation of data into or from said plurality of storage devices, and receive notification that the write or read operation of data into or from said plurality of storage devices is normally completed;

channel control sections which receive a request for write or read operation from a network outside the disk array apparatus itself;

a shared memory in which pieces of control information communicated by said channel control sections and said storage device control sections are stored;

a cache memory in which pieces of data for communication between said channel control sections and said storage device control sections are temporarily stored; and a connecting sections connected to said channel control sections, said storage device control sections, said shared memory, and said cache memory, wherein said storage device control sections generate logical storage areas using said storage areas in said plurality of storage devices, said logical storage areas being used for writing or reading data and having redundancy to store data, wherein said storage device control sections monitor said storing areas in which a request for writing or reading data into or from the plurality of storage devices forming the logical storage areas is stored, wherein among the plurality of storage devices forming the logical storage areas, said storage device control sections specify a storage device, for which a number of repeated times is large, and block said specified storage device, wherein said plurality of storage devices have redundancy, and wherein said storage device control sections have areas which hold queue numbers for each of the plurality of storage devices, compare said queue numbers among said plurality of storage devices with the redundancy when the storage device with a larger number of repeated times for writing or reading data is specified, and specify the storage device with larger average response time as one to be blocked.

8. A method for controlling a disk array apparatus, said apparatus comprising:

a plurality of storage devices by which writing or reading data is executed in such a way that, when there is caused an error in writing or reading data into or from a storage area, writing or reading data is repeated again until completed and thereafter notifying that writing or reading data has been normally completed;

storage device control sections which include storing areas storing requests for write or read operations of data into or from said plurality of storage devices, control write or read operation of data into or from said plurality of storage devices, and receive notification that the write or read operation of data into or from said plurality of storage devices is normally completed;

channel control sections which receive a request for write or read operation from a network outside the disk array apparatus itself;

a shared memory in which pieces of control information communicated by said channel control sections and said storage device control sections are stored;

a cache memory in which pieces of data for communication between said channel control section and said storage device control section are temporarily stored; and a connecting sections connected to said channel control sections, said storage device control sections, said shared memory, and said cache memory, wherein said storage device control sections generate logical storage areas using said storage areas in said plurality of storage devices, said logical storage areas being used for writing or reading data and having redundancy to store data, wherein said storage device control sections monitor said storing areas in which a request for writing or reading data into or from the plurality of storage devices forming the logical storage areas is stored, wherein among the plurality of storage devices forming the logical storage areas, said storage device control sections specify a storage device, for which a number of repeated times is large, and block said specified storage device, wherein said plurality of storage devices have redundancy, wherein said disk array apparatus further comprises a management terminal connected to said connecting section, wherein said management terminal sets conditions for specifying, among the storage devices with the redundancy, the storage device with a larger number of repeated times for writing or reading data, and wherein one of the conditions is a differential multiple of an amount of a piece of write pending data in the cache memory to be written into said storage devices.

9. A method for controlling a disk array apparatus, said apparatus comprising:

a plurality of storage devices by which writing or reading data is executed in such a way that, when there is caused an error in writing or reading data into or from a storage area, writing or reading data is repeated again until completed and thereafter notifying that writing or reading data has been normally completed;

storage device control sections which include storing areas storing requests for write or read operations of data into or from said plurality of storage devices, control write or read operation of data into or from said plurality of storage devices, and receive notification that the write or read operation of data into or from said plurality of storage devices is normally completed;

channel control sections which receive a request for write or read operation from a network outside the disk array apparatus itself;

a shared memory in which pieces of control information communicated by said channel control sections and said storage device control sections are stored;

a cache memory in which pieces of data for communication between said channel control sections and said storage device control sections are temporarily stored; and a connecting sections connected to said channel control sections, said storage device control sections, said shared memory, and said cache memory, wherein said storage device control sections generate logical storage areas using said storage areas in said plurality of storage devices, said logical storage areas being used for writing or reading data and having redundancy to store data, wherein said storage device control sections monitor said storing areas in which a request for writing or reading data into or from the plurality of storage devices forming the logical storage areas is stored, wherein among the plurality of storage devices forming the logical storage areas, said storage device control sections specify a storage device, for which a number of repeated times is large, and block said specified storage device, wherein said plurality of storage devices have redundancy, wherein said disk array apparatus further comprises a management terminal connected to said connecting section, wherein said management terminal sets conditions for specifying, among the storage devices with the redundancy, the storage device with a larger number of repeated times for writing or reading data, wherein one of the conditions is a differential multiple of an average response time for each of said plurality of storage devices.

10. A method for controlling a disk array apparatus, said apparatus comprising:

a plurality of storage devices by which writing or reading data is executed in such a way that, when there is caused an error in writing or reading data into or from a storage area, writing or reading data is repeated again until completed and thereafter notifying that writing or reading data has been normally completed;

storage device control sections which include storing areas storing requests for write or read operations of data into or from said plurality of storage devices, control write or read operation of data into or from said plurality of storage devices, and receive notification that the write or read operation of data into or from said plurality of storage devices is normally completed;

channel control sections which receive a request for write or read operation from a network outside the disk array apparatus itself;

a shared memory in which pieces of control information communicated by said channel control sections and said storage device control sections are stored;

a cache memory in which pieces of data for communication between said channel control sections and said storage device control sections are temporarily stored; and a connecting sections connected to said channel control sections, said storage device control sections, said shared memory, and said cache memory, wherein said storage device control sections generate logical storage areas using said storage areas in said plurality of storage devices, said logical storage areas being used for writing or reading data and having redundancy to store data, wherein said storage device control sections monitor said storing areas in which a request for writing or reading data into or from the plurality of storage devices forming the logical storage areas is stored, wherein among the plurality of storage devices forming the logical storage areas, said storage device control sections specify a storage device, for which a number of repeated times is large, and block said specified storage device, wherein said plurality of storage devices have redundancy, wherein said disk array apparatus further comprises a management terminal connected to said connecting section, wherein said management terminal sets conditions for specifying, among the storage devices with the redundancy, the storage device with a larger number of repeated times for writing or reading data, and wherein one of the conditions is a differential multiple of a queue number for each of said plurality of storage devices.

* * * * *